United States Patent
Lee et al.

(10) Patent No.: US 10,256,526 B2
(45) Date of Patent: Apr. 9, 2019

(54) NEAR FIELD COMMUNICATION ANTENNA, NEAR FIELD COMMUNICATION DEVICE AND MOBILE DEVICE HAVING THE SAME

(71) Applicant: SAMSUNG ELECTRONICS CO., LTD., Suwon-si (KR)

(72) Inventors: Young-Ki Lee, Incheon (KR); Jae-Suk Lee, Suwon-si (KR); Il-Jong Song, Suwon-si (KR); Sang-Su Shin, Jecheon-si (KR); Yo-Han Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 15/196,358

(22) Filed: Jun. 29, 2016

(65) Prior Publication Data

US 2016/0380337 A1 Dec. 29, 2016

(30) Foreign Application Priority Data

Jun. 29, 2015 (KR) ........................ 10-2015-0091789

(51) Int. Cl.
*H01Q 1/24* (2006.01)
*H01Q 1/48* (2006.01)
*H01Q 21/28* (2006.01)
*H04B 5/00* (2006.01)
*H01Q 7/00* (2006.01)

(52) U.S. Cl.
CPC ............ *H01Q 1/243* (2013.01); *H01Q 21/28* (2013.01); *H04B 5/0031* (2013.01); *H01Q 1/48* (2013.01); *H01Q 7/00* (2013.01)

(58) Field of Classification Search
None
See application file for complete search history.

(56) References Cited

U.S. PATENT DOCUMENTS

| | | | |
|---|---|---|---|
| 8,406,686 B2 | 3/2013 | Tsushima et al. | |
| 8,799,084 B2 | 8/2014 | Florek et al. | |
| 2009/0312054 A1 | 12/2009 | Choi | |
| 2012/0025939 A1 | 2/2012 | Yamaguchi et al. | |
| 2013/0342973 A1 | 12/2013 | Lin | |
| 2014/0139380 A1* | 5/2014 | Ouyang | H01Q 7/00 343/702 |
| 2016/0315373 A1* | 10/2016 | Azad | H01Q 1/243 |

FOREIGN PATENT DOCUMENTS

| | | |
|---|---|---|
| JP | 2005-333244 A | 12/2005 |
| JP | 2012-134605 A | 7/2012 |
| JP | 2014-103589 A | 6/2014 |
| KR | 10-1246576 B1 | 3/2013 |
| KR | 10-2014-0131310 A | 11/2014 |

* cited by examiner

*Primary Examiner* — Robert Karacsony
(74) *Attorney, Agent, or Firm* — Sughrue Mion, PLLC

(57) ABSTRACT

A near field communication antenna included in a mobile device includes a body case and a loop antenna. The body case accommodates semiconductor devices included in the mobile device, and includes a metal material. The loop antenna is electrically connected to the body case. The loop antenna and a first portion of the body case form a signal path to perform a near field communication.

12 Claims, 22 Drawing Sheets

NEAR FIELD COMMUNICATION ANTENNA, NEAR FIELD COMMUNICATION DEVICE AND MOBILE DEVICE HAVING THE SAME

CROSS-REFERENCE TO RELATED APPLICATION(S)

This application claims priority from Korean Patent Application No. 10-2015-0091789, filed on Jun. 29, 2015, in the Korean Intellectual Property Office (KIPO), the disclosure of which is herein incorporated in its entirety by reference.

BACKGROUND

1. Field

Apparatuses consistent with example embodiments relate to a wireless communication technology, and more particularly to an antenna for near field communication (NFC), an NFC device including the antenna, and a mobile device including the NFC device.

2. Description of the Related Art

To perform a near field communication (NFC) in a mobile device, such as a smart phone, or a tablet computer, an NFC chip is embedded in the mobile device, and an antenna for transmitting/receiving a signal from/to the NFC chip is attached to an inside of a body case of the mobile device. The body case can be formed of resin or plastic.

Recently, as the mobile device has become thinner, the strength of the mobile device has been reduced. Thus, a body case of a metal material has been developed to compensate the reduction in strength of the mobile device. However, in the case where the body case of the mobile device is made of the metal material, the antenna attached to an inside of the body case is shielded by the metal material, which hinders an emission of an electromagnetic wave for the NFC, such that performance of the NFC decreases.

SUMMARY

One or more example embodiments provide a near field communication (NFC) antenna having a higher performance in a mobile device including a body case of a metal material.

One or more example embodiments provide an NFC device including the NFC antenna.

One or more example embodiments provide a mobile device including the NFC device.

According to example embodiments, a near field communication antenna included in a mobile device includes a body case and a loop antenna. The body case accommodate semiconductor devices included in the mobile device, and includes a metal material. The loop antenna is electrically connected to the body case. The loop antenna and a first portion of the body case form a signal path to perform a near field communication.

In example embodiments, a second portion of the body case may operate as an antenna to perform a non-near field communication.

At least an area of the first portion of the body case may be overlapped with at least an area of the second portion of the body case.

A frequency band used in the near field communication may be different from a frequency band used in the non-near field communication.

In example embodiments, the body case may include a first metal structure including the metal material, and configured to operate as an antenna to perform a non-near field communication, a second metal structure including the metal material, and an insulator between the first metal structure and the second metal structure. The insulator may electrically insulate the first metal structure and the second metal structure.

The first metal structure of the body case may be exposed to an outside at a first side of the mobile device.

A first end portion of the loop antenna may be coupled to the first metal structure at a first point, and a second end portion of the loop antenna may be coupled to the second metal structure at a second point. The body case further may include a first antenna electrode coupled to the first metal structure at a third point, which is spaced apart from the first point, and a second antenna electrode coupled to the second metal structure at a fourth point, which is spaced apart from the second point.

The signal path may include the first antenna electrode, at least a portion of the first metal structure, the loop antenna, at least a portion of the second metal structure, and the second antenna electrode.

The body case may further include a first inductor coupled between the third point and the first antenna electrode, and a second inductor coupled between the fourth point and the second antenna electrode.

The body case may further include a first low pass filter coupled between the third point and the first antenna electrode, and a second low pass filter coupled between the fourth point and the second antenna electrode.

A first end portion of the loop antenna may be coupled to the first metal structure at a first point. The body case may further include a first antenna electrode coupled to a second end portion of the loop antenna, and a second antenna electrode coupled to the first metal structure at a second point, which is spaced apart from the first point.

The signal path may include the first antenna electrode, the loop antenna, at least a portion of the first metal structure, and the second antenna electrode.

The body case may further include a first inductor coupled between the first point and the first end portion of the loop antenna, and a second inductor coupled between the second point and the second antenna electrode.

The body case may further include a first low pass filter coupled between the first point and the first end portion of the loop antenna, and a second low pass filter coupled between the second point and the second antenna electrode.

A first end portion of the loop antenna may be coupled to the second metal structure at a first point. The body case may further include a first antenna electrode coupled to a second end portion of the loop antenna, a second antenna electrode coupled to the first metal structure at a second point, and a first inductor electrically connecting the first metal structure and the second metal structure.

The signal path may include the first antenna electrode, the loop antenna, at least a portion of the second metal structure, the first inductor, at least a portion of the first metal structure, and the second antenna electrode.

The body case may further include a second inductor coupled between the first point and the first end portion of the loop antenna, and a third inductor coupled between the second point and the second antenna electrode.

The body case may further include a first low pass filter coupled between the first point and the first end portion of the loop antenna, and a second low pass filter coupled between the second point and the second antenna electrode.

A first end portion of the loop antenna may be coupled to the second metal structure at a first point, and the first metal structure may be coupled to a ground voltage at a second point. The body case may further include a first antenna electrode coupled to a second end portion of the loop antenna, and a first inductor electrically connecting the first metal structure and the second metal structure.

The signal path may include the first antenna electrode, the loop antenna, at least a portion of the second metal structure, the first inductor, at least a portion of the first metal structure, and the ground voltage.

The body case may further include a second inductor coupled between the first point and the first end portion of the loop antenna.

The body case may further include a first low pass filter coupled between the first point and the first end portion of the loop antenna.

The body case may further include a back surface cover configured to cover a surface of the mobile device, the back surface cover including an insulating material.

The body case may further include a back surface cover configured to cover a surface of the mobile device, and including the metal material. The second metal structure may include at least a portion of the back surface cover.

In example embodiments, the near field communication antenna may further include a magnetic sheet under the loop antenna.

The mobile device may further include a display disposed at a surface of the mobile device, and the body case may surround the display device.

According to example embodiments, a near field communication device included in a mobile device includes a near field communication chip, a near field communication antenna, and a matching circuit. The near field communication chip outputs a near field communication signal. The near field communication antenna includes a body case of the mobile device and a loop antenna electrically connected to the body case, and performs a near field communication based on the near field communication signal. The body case includes a metal material and accommodates the near field communication chip. The matching circuit is coupled between the near field communication chip and the near field communication antenna, and performs an impedance matching between the near field communication chip and the near field communication antenna.

According to example embodiments, a mobile device includes a body case, a loop antenna, a non-near field communication chip, and a near field communication chip. The body case includes a metal material and accommodates semiconductor devices included in the mobile device. The loop antenna is electrically connected to the body case. The non-near field communication chip is accommodated by the body case, and performs a non-near field communication using a first portion of the body case. The near field communication chip is accommodated by the body case, and performs a near field communication using and the loop antenna a second portion of the body case. At least an area of the first portion of the body case may be overlapped with at least an area of the second portion of the body case.

According to example embodiments, a near field communication (NFC) device include: an NFC chip configured to perform a near field communication; and a loop antenna configured to transceive a signal to and/or from the NFC chip, wherein the loop antenna is electrically connected to a body case of the NFC device, the body case including a metal material and providing at least a portion of an external appearance of the NFC device.

The body case may include a frame disposed at a first surface of the body case, the frame defining a perimeter of the NFC device; a back surface part disposed at a second surface of the body case, wherein the loop antenna is disposed on the back surface part and is electrically connected to at least a portion of the frame.

The frame may include metal regions and insulating regions, the insulating regions configured to insulate the metal regions.

The loop antenna may be electrically connected to a metal region of the frame, the metal region being defined by the insulating regions, and the metal region may be used to perform a non-NFC communication

BRIEF DESCRIPTION OF THE DRAWINGS

The above and/or other aspects will be more apparent by describing certain example embodiments with reference to the accompanying drawings.

DETAILED DESCRIPTION

Figure 1:
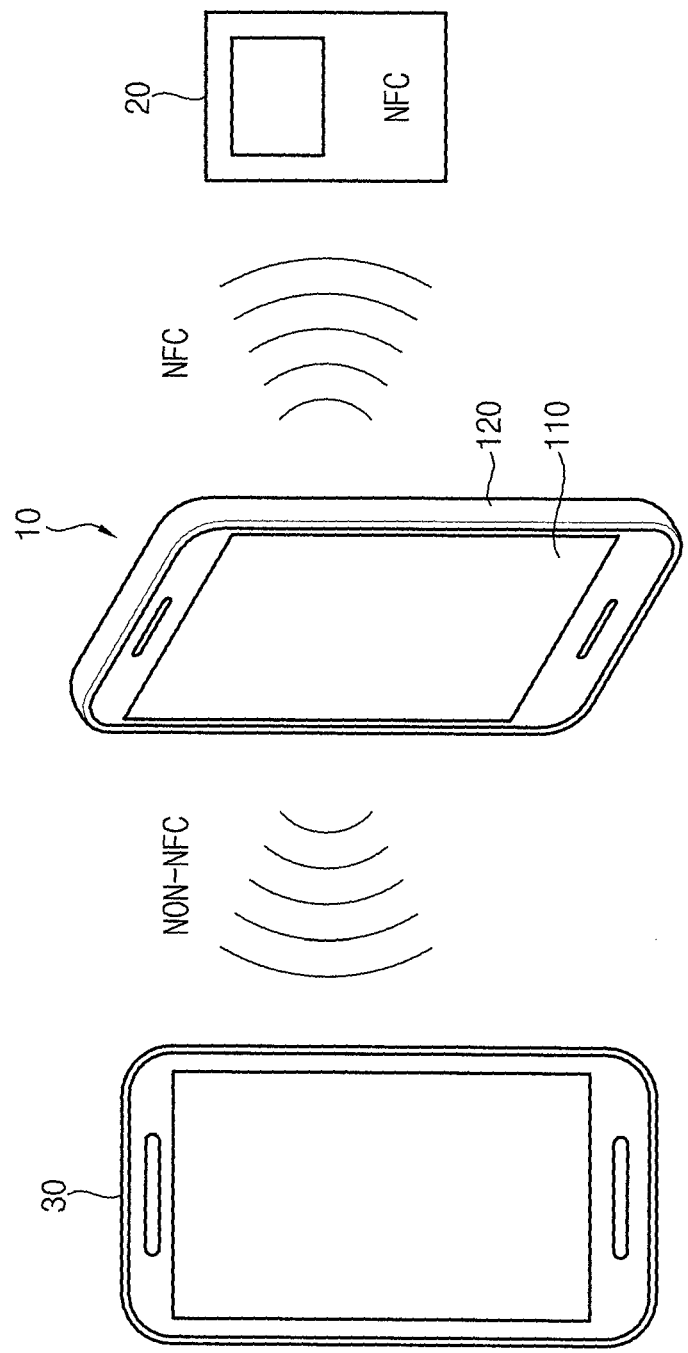
FIG. 1 is a diagram illustrating a mobile device according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a mobile device according to example embodiments.

Referring to FIG. 1, a mobile device 10 includes a display device 110 provided at a first surface (e.g., a front surface) of the mobile device 10 and a body case 120 surrounding the display device 110. For example, the body case 120 may form a perimeter of the mobile device 10, and cover a second surface (e.g., a back surface) of the mobile device 10. Further, semiconductor devices included in the mobile device 10 may be embedded in the body case 120.

According to example embodiments, the mobile device 10 may include any mobile device, such as a cellular phone, a smart phone, a tablet computer, a wearable device, a smart watch, smart glasses, a laptop computer, a personal digital assistant (PDA), a portable multimedia player (PMP), a digital camera, a music player, a portable game console, a navigation device, etc.

The body case 120 may include a metal material having a desired strength and a desired electrical conductivity. For example, at least a portion of the body case 120 may include at least one of copper (Cu), aluminum (Al), iron (Fe), titanium (Ti), silver (Ag), palladium (Pd), platinum (Pt), aurum (Au), nickel (Ni) and the like. Since at least a portion the body case 120 includes the metal material, the mobile device 10 may have an improved strength and an appealing appearance.

The mobile device 10 may further include a loop antenna electrically connected to the body case 120. In addition, the mobile device 10 may further include a near field communication (NFC) chip and a non-near field communication (non-NFC) chip inside the body case 120.

A first portion of the body case 120 and the loop antenna electrically connected to the body case 120 may operate as an antenna for an NFC. That is, the first portion of the body case 120 and the loop antenna may correspond to an NFC antenna. Therefore, the NFC chip included in the mobile device 10 may perform the NFC with an external NFC device 20 (e.g., an NFC reader or an NFC card) using a signal path including the first portion of the body case 120 and the loop antenna.

A second portion of the body case 120 may operate as an antenna for a non-NFC. That is, the second portion of the body case 120 may correspond to a non-NFC antenna. Here, the non-NFC may include a cellular telephone communication, such as a long term evolution (LTE) communication, a wideband code division multiple access (WCDMA) communication, etc., a wireless local area network (WLAN) communication, a global positioning system (GPS) communication, a Bluetooth communication, or the like. Therefore, the non-NFC chip included in the mobile device 10 may perform the non-NFC with an external mobile device 30 using a signal path including the second portion of the body case 120.

In some example embodiments, the second portion of the body case 120, which operates as the non-NFC antenna, may be overlapped with the first portion of the body case 120, which operates as the NFC antenna together with the loop antenna.

A frequency band (e.g., about 700 MHz or above) used in the non-NFC, which is performed using the second portion of the body case 120, may be different from a frequency band (e.g., about 13.56 MHz) used in the NFC, which is performed using the first portion of the body case 120 and the loop antenna.

In a related art mobile device, an NFC antenna is attached to an inside of a cover of the related art mobile device, or is formed on a battery of the related art mobile device. Recently, as the mobile device has become thinner, the strength of the mobile device has been reduced. Thus, a body case of a metal material has been developed to compensate the reduction in strength. However, in the case where the body case of the mobile device includes the metal material, the NFC antenna attached to an inside of the body case may be shielded by the body case including the metal material. Therefore, an NFC signal (e.g., an electromagnetic wave) communicated by the NFC antenna may be distorted.

On the other hand, as described above, in the mobile device 10 according to example embodiments, the body case 120 including a metal material may operate as the NFC antenna together with the loop antenna. Therefore, the mobile device 10 according to example embodiments may accurately perform the NFC without signal distortion, and a communication distance of the mobile device 10 may be effectively increased.

Figure 2:
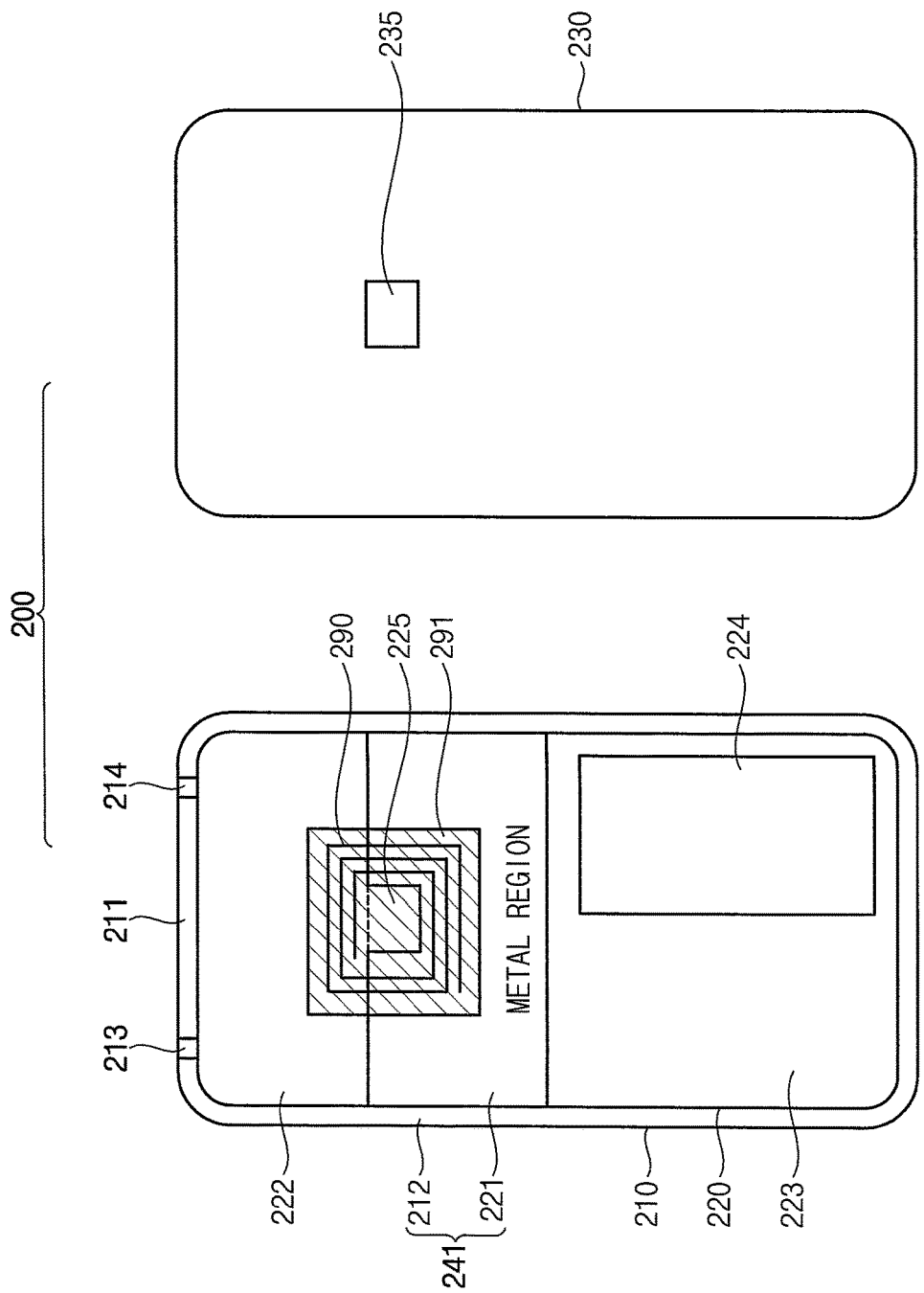
FIG. 2 is a diagram illustrating a body case of a mobile device according to example embodiments.

FIG. 2 is a diagram illustrating a body case of a mobile device according to example embodiments.

The body case 120 included in the mobile device 10 of FIG. 1 may be implemented with a body case 200 of FIG. 2. Therefore, FIG. 2 may represent a back surface and sidewalls of the mobile device 10 of FIG. 1.

Referring to FIG. 2, the body case 200 may include a frame 210 defining a perimeter of the mobile device 10, a back surface part 220 disposed at the back surface of the mobile device 10 that is opposite to a front surface of the mobile device 10 at which the display device 110 is disposed, and a back surface cover 230 covering the back surface part 220. The frame 210 may not be disposed at a same level as the back surface part 220. For example, the frame 210 may be positioned to form a certain angle (e.g., 90 degrees) with respect to the back surface part 220.

In some example embodiments, the back surface cover 230 may not be detached from the back surface part 220. For example, the back surface cover 230 and the back surface part 220 may be integrally formed to have an integral structure. In other example embodiments, the back surface cover 230 and the back surface part 220 may be separately formed, and then be bonded to each other such that the back surface cover 230 is not detached from the back surface part 220.

In still other example embodiments, the back surface cover 230 may be detachably attached to the back surface part 220. For example, the back surface cover 230 may be detached from the back surface part 220 to change a battery of the mobile device 10, and then be attached to the back surface part 220 after the battery is changed.

To describe a structure of the back surface part 220, FIG. 2 illustrates the body case 200 in which the back surface cover 230 is detached from the back surface part 220.

In some example embodiments, the back surface cover 230 may include an insulating material.

The frame 210 may form a sidewall of the mobile device 10, and support the display device 110 disposed at the front surface of the mobile device 10. The NFC chip and the non-NFC chip included in the mobile device 10 may be embedded in the frame 210.

The frame 210 may include a first metal region 211, a second metal region 212, and insulating regions 213 and 214. The insulating regions 213 and 214 may be disposed between the first metal region 211 and the second metal region 212 to electrically insulate the first metal region 211 and the second metal region 212.

The first metal region 211 and the second metal region 212 may include a metal material having a desired strength and a desired electrical conductivity. For example, the first metal region 211 and the second metal region 212 may include at least one of copper (Cu), aluminum (Al), iron (Fe), titanium (Ti), silver (Ag), palladium (Pd), platinum (Pt), aurum (Au), nickel (Ni) and the like.

The insulating regions 213 and 214 may include an insulating material. For example, the insulating regions 213 and 214 may include a polyimide, a plastic, a polymer, a ceramic, a glass, or the like.

As illustrated in FIG. 2, the first metal region 211 of the frame 210 may be exposed to an outside at a first side of the mobile device 10. For example, the first metal region 211 of the frame 210 may be exposed at an upper surface of the mobile device 10. In addition, the first metal region 211 may operate as an antenna for the non-NFC. That is, the first metal region 211 may correspond to the non-NFC antenna. The non-NFC may include a cellular telephone communication, such as a long term evolution (LTE) communication, a wideband code division multiple access (WCDMA) communication, etc., a wireless local area network (WLAN) communication, a global positioning system (GPS) communication, a Bluetooth communication, or the like. A length of the first metal region 211, which is defined by the insulating regions 213 and 214, may be determined based on a frequency band of the non-NFC. Hereinafter, the first metal region 211 of the frame 210 is also referred to as a first metal structure 211.

The back surface part 220 may be disposed at the back surface of the mobile device 10 that is opposite to the front surface of the mobile device 10 at which the display device 110 is disposed. The back surface part 220 may be connected to the frame 210, such that semiconductor devices included in the mobile device 10 (e.g., the NFC chip and the non-NFC chip) may be located in a space formed by the display device 110, the frame 210, and the back surface part 220.

The back surface part 220 may include a metal region 221 and an insulating region 222.

The metal region 221 may be electrically connected to the second metal region 212 of the frame 210. For example, the metal region 221 may include at least one of copper (Cu), aluminum (Al), iron (Fe), titanium (Ti), silver (Ag), palladium (Pd), platinum (Pt), aurum (Au), nickel (Ni) and the like. The metal region 221 of the back surface part 220 and the second metal region 212 of the frame 210 may form a second metal structure 241.

The insulating region 222 may electrically insulate the metal region 221 of the back surface part 220 and the first metal region 211 of the frame 210. For example, the insulating region 222 may include a polyimide, a plastic, a polymer, a ceramic, a glass, or the like.

According to example embodiments, the back surface part 220 may include a camera hole 225 that exposes a camera module (or a camera) of the mobile device 10. In this case, the back surface cover 230 may also have a camera hole 235 that, when the back surface cover 230 is attached to the back surface part 220, faces the camera hole 225 of the back surface part 220 and exposes the camera module of the mobile device 10 therethrough. In addition, the back surface part 220 may further include a battery installation area 224 provided at a lower portion 223 of the back surface part 220. A battery of the mobile device 10 may be installed in the battery installation area 224. The lower portion 223 of the back surface part 220 may include an insulating material.

The mobile device 10 may include a loop antenna 290 electrically connected to the body case 200. The loop antenna 290 may be electrically connected to at least one of the first metal structure 211 and the second metal structure 241 of the body case 200.

Although the loop antenna 290 is illustrated to be disposed around the camera hole 225 in FIG. 2, a location of the loop antenna 290 is not limited thereto. For example, the loop antenna 290 may be attached to a battery of the mobile device 10 or on an inside of the back surface cover 230. Hereinafter, for ease of explanation, the loop antenna 290 is assumed to be disposed around the camera hole 225.

As will be described later, the mobile device 10 may perform the NFC using a signal path including the loop antenna 290 and at least a portion of the first metal structure 211 and the second metal structure 241 of the body case 200. That is, the loop antenna 290 and at least a portion of the first metal structure 211 and the second metal structure 241 of the body case 200 may operate as an antenna for the NFC.

In addition, the body case 200 may further include an inductor or a low pass filter formed on the signal path including the loop antenna 290 and at least a portion of the first metal structure 211 and the second metal structure 241. The inductor or the low pass filter formed on the signal path may block a signal component having a frequency other than an operating frequency (e.g., about 13.56 MHz) of the NFC, thereby reducing interference to the non-NFC that is performed by using the first metal region 211.

In some example embodiments, the body case 200 may further include a magnetic sheet 291 disposed under the loop antenna 290. For example, the magnetic sheet 291 may be a ferrite sheet or a magneto-dielectric material (MDM) sheet. The magnetic sheet 291 may improve electromagnetic wave radiation efficiency.

Hereinafter, with reference to FIGS. 3 to 14, various example embodiments of the NFC antenna will be described based on connections between the loop antenna 290 and the at least one of the first metal structure 211 and the second metal structure 241.

Figure 3:
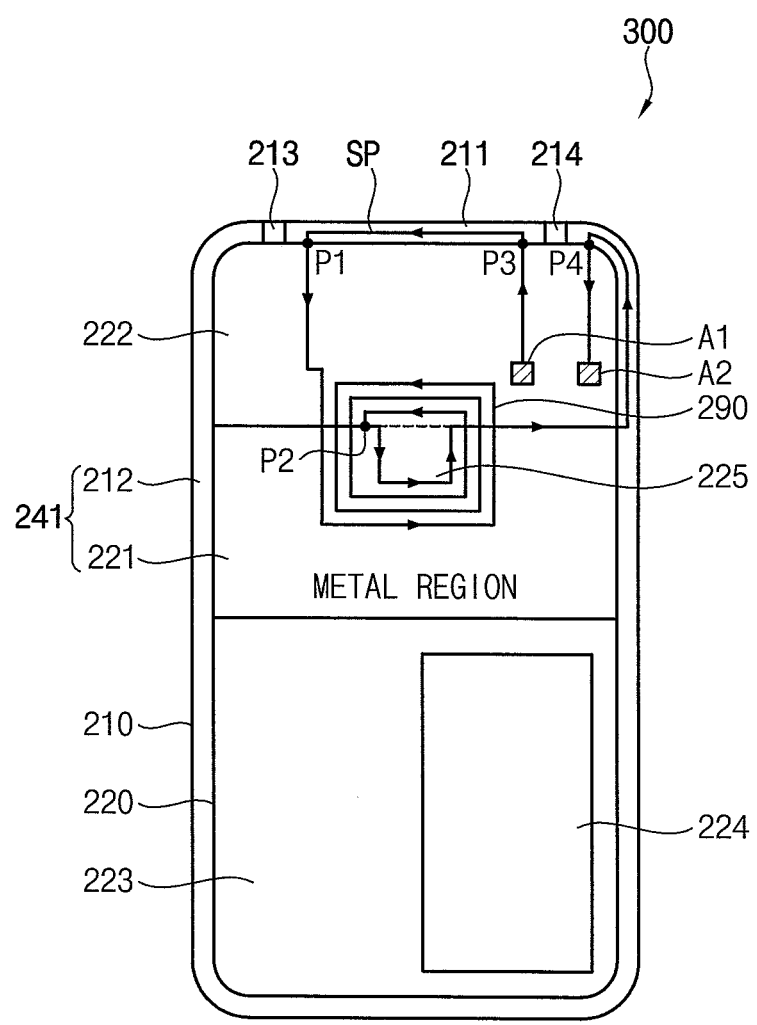
FIGS. 3 to 14 are diagrams illustrating examples of the body case of FIG. 2.

FIG. 3 is a diagram illustrating an example of the body case of FIG. 2.

A body case 300 of FIG. 3 shows an example of a connection between the loop antenna 290 and the body case 200 of FIG. 2. As will be described later, at least a portion of the body case 300 may operate as the NFC antenna together with the loop antenna 290.

Referring to FIG. 3, a first end (or a first end portion) of the loop antenna 290 may be coupled to the first metal structure 211 of the body case 300 at a first point P1. In addition, a second end (or a second end portion) of the loop antenna 290 may be coupled to the second metal structure 241 of the body case 300 at a second point P2. For example, as illustrated in FIG. 3, the second end of the loop antenna 290 may be coupled to the second metal structure 241, which includes the metal region 221 of the back surface part 220 and the second metal region 212 of the frame 210, by being connected to the metal region 221 of the back surface part 220 at the second point P2.

The body case 300 may further include a first antenna electrode A1, which is coupled to the first metal structure 211 at a third point P3 that is spaced apart from the first point P1 of the first metal structure 211, and a second antenna electrode A2, which is coupled to the second metal structure 241 at a fourth point P4 that is spaced apart from the second point P2 of the second metal structure 241.

The first antenna electrode A1 and the second antenna electrode A2 may be coupled to the NFC chip included in the mobile device 10.

Therefore, as illustrated in FIG. 3, a signal path SP (e.g., a current path), which includes the first antenna electrode A1, at least a portion of the first metal structure 211, the loop antenna 290, at least a portion of the second metal structure 241, and the second antenna electrode A2, may be formed in the mobile device 10. Since the body case 300 and the loop antenna 290 have an inductance and a capacitance by forming the signal path SP between the first antenna electrode A1 and the second antenna electrode A2, the body case 300 and the loop antenna 290 may operate as a resonator having a desired resonance frequency suitable for the NFC. Therefore, the body case 300 and the loop antenna 290 may operate as the NFC antenna by emitting an electromagnetic wave through the signal path SP, based on a signal received from the NFC chip through the first antenna electrode A1 and the second antenna electrode A2.

As described above with reference to FIG. 3, since the NFC antenna including the body case 300 and the loop antenna 290 emits an electromagnetic wave through the body case 300 including a metal material in addition to emitting an electromagnetic wave through the loop antenna 290, a performance of the NFC of the mobile device 10 may increase. In addition, since the NFC antenna emits an electromagnetic wave both in a direction of the back surface of the mobile device 10 through the loop antenna 290 and in a direction of the upper surface of the mobile device 10 through the first metal structure 211 that is exposed at the upper surface of the mobile device 10, a recognition range of the NFC of the mobile device 10 may be widened.

Figure 4:
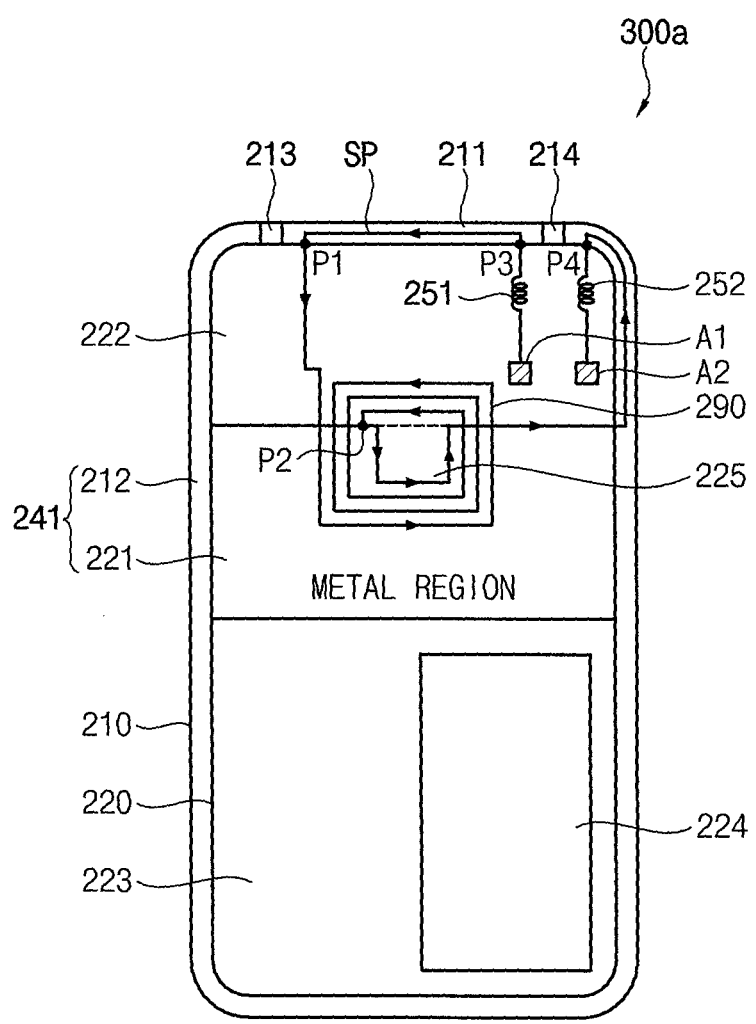

FIG. 4 is a diagram illustrating an example of the body case of FIG. 2.

A body case 300a of FIG. 4 may further include a first inductor 251 and a second inductor 252, compared to the body case 300 of FIG. 3.

Referring to FIG. 4, the first inductor 251 may be coupled between the third point P3 of the first metal structure 211 and the first antenna electrode A1. The second inductor 252 may be coupled between the fourth point P4 of the second metal structure 241 and the second antenna electrode A2.

In addition, the first antenna electrode A1 and the second antenna electrode A2 may be coupled to the NFC chip included in the mobile device 10.

Therefore, as illustrated in FIG. 4, a signal path SP (e.g., a current path), which includes the first antenna electrode A1, the first inductor 251, at least a portion of the first metal structure 211, the loop antenna 290, at least a portion of the second metal structure 241, the second inductor 252, and the second antenna electrode A2, may be formed in the mobile device 10. Since the body case 300a and the loop antenna 290 have an inductance and a capacitance by forming the signal path SP between the first antenna electrode A1 and the second antenna electrode A2, the body case 300a and the loop antenna 290 may operate as a resonator having a desired resonance frequency suitable for the NFC. Therefore, the body case 300a and the loop antenna 290 may operate as the NFC antenna by emitting an electromagnetic wave through the signal path SP, based on a signal received from the NFC chip through the first antenna electrode A1 and the second antenna electrode A2.

Since the first inductor 251 and the second inductor 252 are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 300a and the loop antenna 290 may effectively reduce interference to the non-NFC that is performed by using the first metal region 211.

Figure 5:
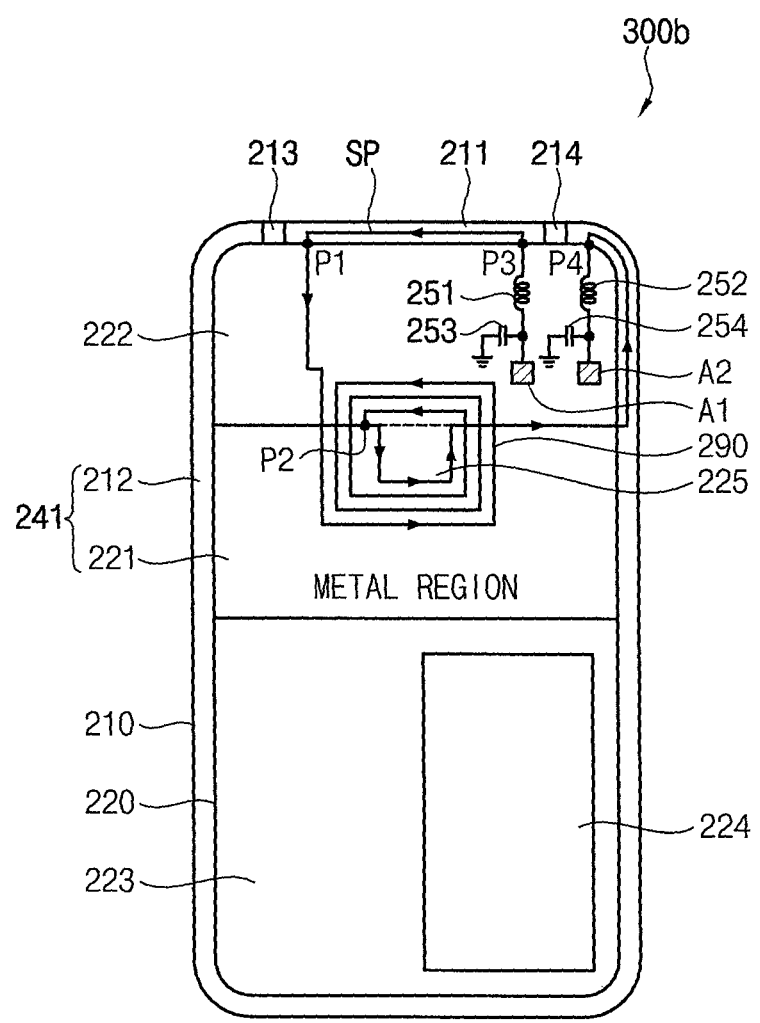

FIG. 5 is a diagram illustrating an example of the body case of FIG. 2.

A body case 300b of FIG. 5 may further include a first low pass filter and a second low pass filter, compared to the body case 300 of FIG. 3.

Referring to FIG. 5, the first low pass filter may be coupled between the third point P3 of the first metal structure 211 and the first antenna electrode A1. The second low pass filter may be coupled between the fourth point P4 of the second metal structure 241 and the second antenna electrode A2.

For example, the first low pass filter may include a first inductor 251 coupled between the third point P3 of the first metal structure 211 and the first antenna electrode A1, and a first capacitor 253 coupled between the first antenna electrode A1 and a ground voltage. In addition, the second low pass filter may include a second inductor 252 coupled between the fourth point P4 of the second metal structure 241 and the second antenna electrode A2, and a second capacitor 254 coupled between the second antenna electrode A2 and the ground voltage.

In addition, the first antenna electrode A1 and the second antenna electrode A2 may be coupled to the NFC chip included in the mobile device 10.

Therefore, as illustrated in FIG. 5, a signal path SP (e.g., a current path), which includes the first antenna electrode A1, the first low pass filter including the first inductor 251 and the first capacitor 253, at least a portion of the first metal structure 211, the loop antenna 290, at least a portion of the second metal structure 241, the second low pass filter including the second inductor 252 and the second capacitor 254, and the second antenna electrode A2, may be formed in the mobile device 10. Since the body case 300b and the loop antenna 290 have an inductance and a capacitance by forming the signal path SP between the first antenna electrode A1 and the second antenna electrode A2, the body case 300b and the loop antenna 290 may operate as a resonator having a desired resonance frequency suitable for the NFC. Therefore, the body case 300b and the loop antenna 290 may operate as the NFC antenna by emitting an electromagnetic wave through the signal path SP, based on a signal received from the NFC chip through the first antenna electrode A1 and the second antenna electrode A2.

Since the first low pass filter and the second low pass filter are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 300b and the loop antenna 290 may effectively reduce interference to the non-NFC that is performed by using the first metal region 211.

Figure 6:
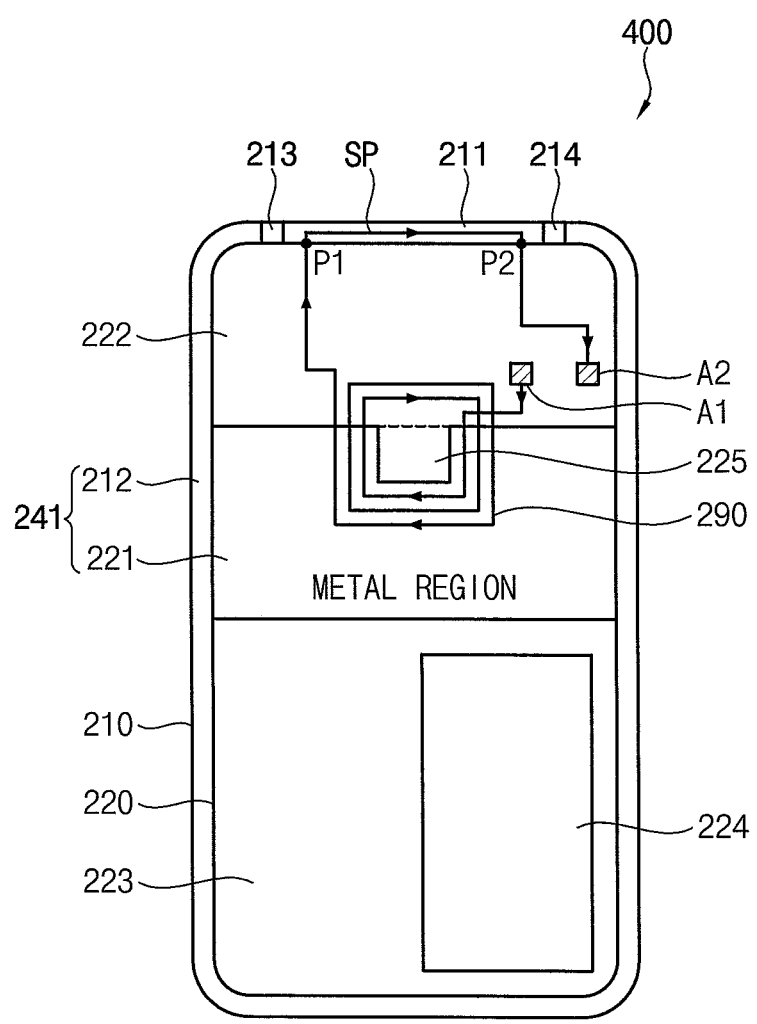

FIG. 6 is a diagram illustrating an example of the body case of FIG. 2.

A body case 400 of FIG. 6 shows an example of a connection between the loop antenna 290 and the body case 200 of FIG. 2. As will be described later, at least a portion of the body case 400 may operate as the NFC antenna together with the loop antenna 290.

Referring to FIG. 6, a first end of the loop antenna 290 may be coupled to the first metal structure 211 of the body case 400 at a first point P1.

The body case 400 may further include a first antenna electrode A1, which is coupled to a second end of the loop antenna 290, and a second antenna electrode A2, which is coupled to the first metal structure 211 at a second point P2, which is spaced apart from the first point P1 of the first metal structure 211.

The first antenna electrode A1 and the second antenna electrode A2 may be coupled to the NFC chip included in the mobile device 10.

Therefore, as illustrated in FIG. 6, a signal path SP (e.g., a current path), which includes the first antenna electrode A1, the loop antenna 290, at least a portion of the first metal structure 211, and the second antenna electrode A2, may be formed in the mobile device 10. Since the body case 400 and the loop antenna 290 have an inductance and a capacitance by forming the signal path SP between the first antenna electrode A1 and the second antenna electrode A2, the body case 400 and the loop antenna 290 may operate as a resonator having a desired resonance frequency suitable for the NFC. Therefore, the body case 400 and the loop antenna 290 may operate as the NFC antenna by emitting an electromagnetic wave through the signal path SP, based on a signal received from the NFC chip through the first antenna electrode A1 and the second antenna electrode A2.

As described above with reference to FIG. 6, since the NFC antenna including the body case 400 and the loop antenna 290 emits an electromagnetic wave through the body case 400 including a metal material in addition to emitting an electromagnetic wave through the loop antenna 290, a performance of the NFC of the mobile device 10 may increase. In addition, since the NFC antenna emits an electromagnetic wave both in a direction of the back surface of the mobile device 10 through the loop antenna 290 and in a direction of the upper surface of the mobile device 10 through the first metal structure 211 that is exposed at the upper surface of the mobile device 10, a recognition range of the NFC of the mobile device 10 may be widened.

Figure 7:
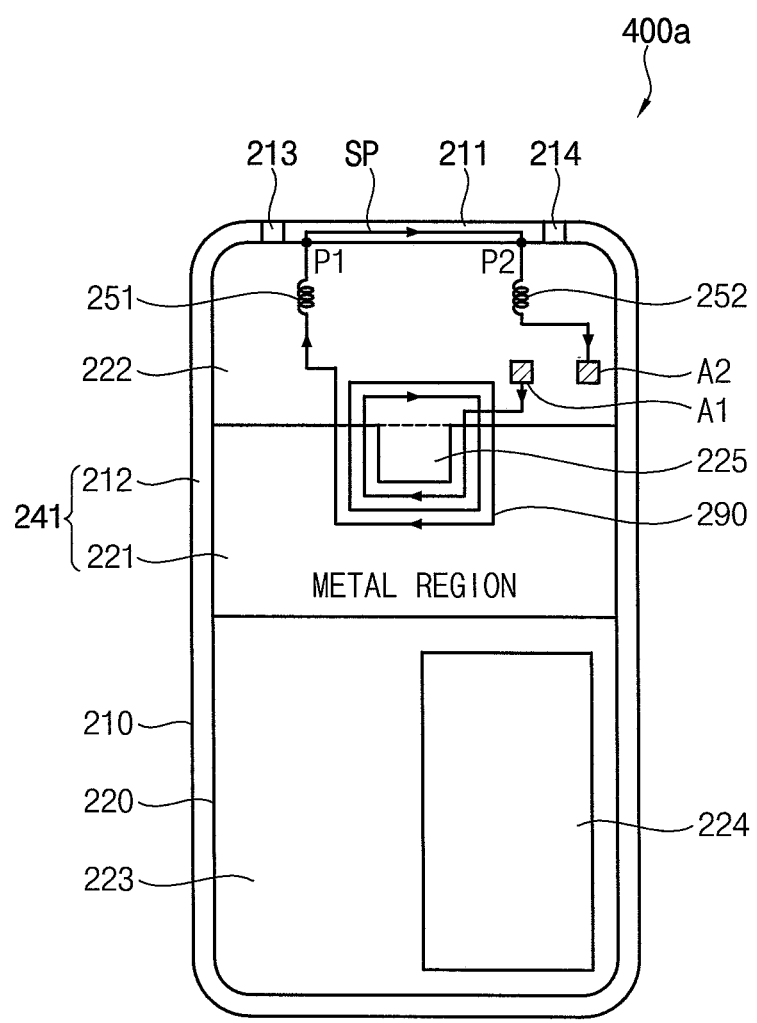

FIG. 7 is a diagram illustrating an example of the body case of FIG. 2.

A body case 400a of FIG. 7 may further include a first inductor 251 and a second inductor 252, compared to the body case 400 of FIG. 6.

Referring to FIG. 7, the first inductor 251 may be coupled between the first point P1 of the first metal structure 211 and the first end of the loop antenna 290. The second inductor 252 may be coupled between the second point P2 of the first metal structure 211 and the second antenna electrode A2.

In addition, the first antenna electrode A1 and the second antenna electrode A2 may be coupled to the NFC chip included in the mobile device 10.

Therefore, as illustrated in FIG. 7, a signal path SP (e.g., a current path), which includes the first antenna electrode A1, the loop antenna 290, the first inductor 251, at least a portion of the first metal structure 211, the second inductor 252, and the second antenna electrode A2, may be formed in the mobile device 10. Since the body case 400a and the loop antenna 290 have an inductance and a capacitance by forming the signal path SP between the first antenna electrode A1 and the second antenna electrode A2, the body case 400a and the loop antenna 290 may operate as a resonator having a desired resonance frequency suitable for the NFC. Therefore, the body case 400a and the loop antenna 290 may operate as the NFC antenna by emitting an electromagnetic wave through the signal path SP, based on a signal received from the NFC chip through the first antenna electrode A1 and the second antenna electrode A2.

Since the first inductor 251 and the second inductor 252 are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 400a and the loop antenna 290 may effectively reduce interference to the non-NFC that is performed by using the first metal region 211.

Figure 8:
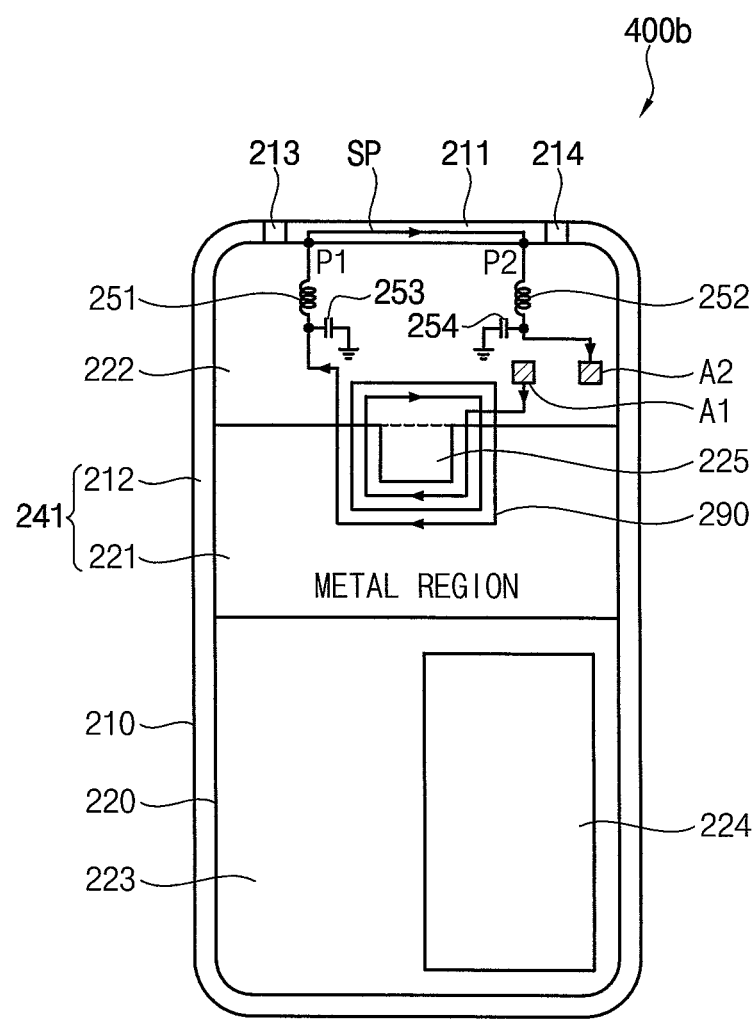

FIG. 8 is a diagram illustrating an example of the body case of FIG. 2.

A body case 400b of FIG. 8 may further include a first low pass filter and a second low pass filter, compared to the body case 400 of FIG. 6.

Referring to FIG. 8, the first low pass filter may be coupled between the first point P1 of the first metal structure 211 and the first end of the loop antenna 290. The second low pass filter may be coupled between the second point P2 of the first metal structure 211 and the second antenna electrode A2.

For example, the first low pass filter may include a first inductor 251 coupled between the first point P1 of the first metal structure 211 and the first end of the loop antenna 290, and a first capacitor 253 coupled between the first end of the loop antenna 290 and a ground voltage. In addition, the second low pass filter may include a second inductor 252 coupled between the second point P2 of the first metal structure 211 and the second antenna electrode A2, and a second capacitor 254 coupled between the second antenna electrode A2 and the ground voltage.

In addition, the first antenna electrode A1 and the second antenna electrode A2 may be coupled to the NFC chip included in the mobile device 10.

Therefore, as illustrated in FIG. 8, a signal path SP (e.g., a current path), which includes the first antenna electrode A1, the loop antenna 290, the first low pass filter including the first inductor 251 and the first capacitor 253, at least a portion of the first metal structure 211, the second low pass filter including the second inductor 252 and the second capacitor 254, and the second antenna electrode A2, may be formed in the mobile device 10. Since the body case 400b and the loop antenna 290 have an inductance and a capacitance by forming the signal path SP between the first antenna electrode A1 and the second antenna electrode A2, the body case 400b and the loop antenna 290 may operate as a resonator having a desired resonance frequency suitable for the NFC. Therefore, the body case 400b and the loop antenna 290 may operate as the NFC antenna by emitting an electromagnetic wave through the signal path SP, based on a signal received from the NFC chip through the first antenna electrode A1 and the second antenna electrode A2.

Since the first low pass filter and the second low pass filter are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 400b and the loop antenna 290 may effectively reduce interference to the non-NFC that is performed by using the first metal region 211.

Figure 9:
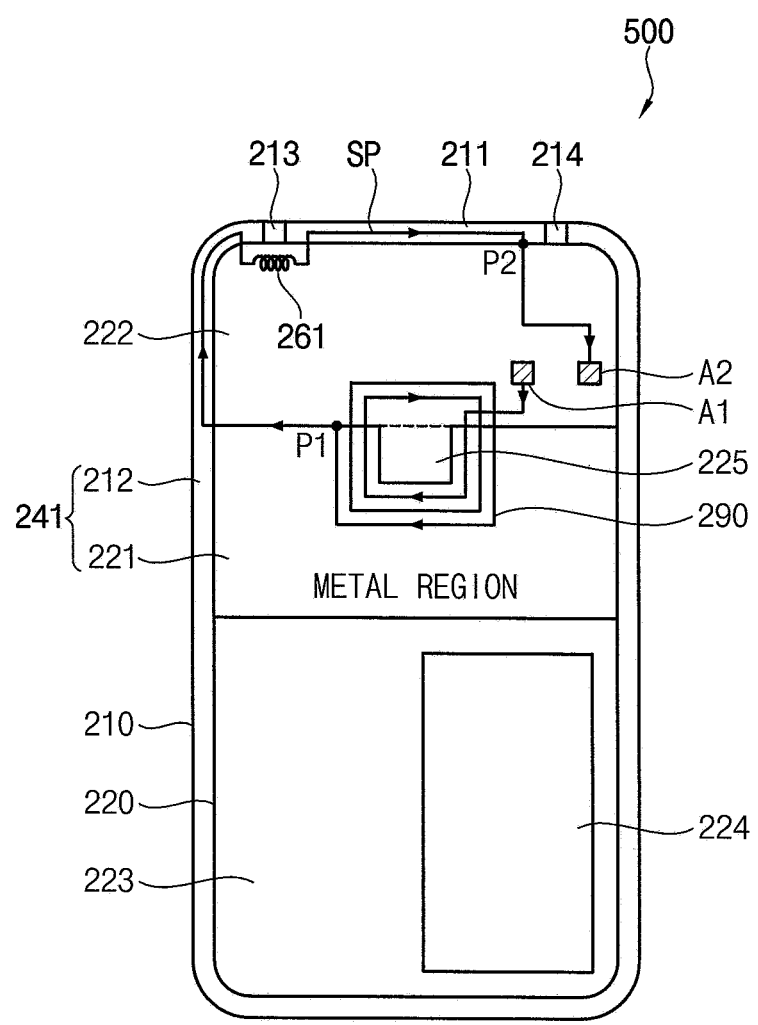

FIG. 9 is a diagram illustrating an example of the body case of FIG. 2.

A body case 500 of FIG. 9 shows an example of a connection between the loop antenna 290 and the body case 200 of FIG. 2. As will be described later, at least a portion of the body case 500 may operate as the NFC antenna together with the loop antenna 290.

Referring to FIG. 9, a first end of the loop antenna 290 may be coupled to the second metal structure 241 of the body case 500 at a first point P1.

The body case 500 may further include a first antenna electrode A1, which is coupled to a second end of the loop antenna 290, a second antenna electrode A2, which is coupled to the first metal structure 211 at a second point P2 of the first metal structure 211, and a connection inductor 261 electrically connecting the first metal structure 211 and the second metal structure 241.

The first antenna electrode A1 and the second antenna electrode A2 may be coupled to the NFC chip included in the mobile device 10.

Therefore, as illustrated in FIG. 9, a signal path SP (e.g., a current path), which includes the first antenna electrode A1, the loop antenna 290, at least a portion of the second metal structure 241, the connection inductor 261, at least a portion of the first metal structure 211, and the second antenna electrode A2, may be formed in the mobile device 10. Since the body case 500 and the loop antenna 290 have an inductance and a capacitance by forming the signal path SP between the first antenna electrode A1 and the second antenna electrode A2, the body case 500 and the loop antenna 290 may operate as a resonator having a desired resonance frequency suitable for the NFC. Therefore, the body case 500 and the loop antenna 290 may operate as the NFC antenna by emitting an electromagnetic wave through the signal path SP, based on a signal received from the NFC chip through the first antenna electrode A1 and the second antenna electrode A2.

As described above with reference to FIG. 9, since the NFC antenna including the body case 500 and the loop antenna 290 emits an electromagnetic wave through the body case 500 including a metal material in addition to emitting an electromagnetic wave through the loop antenna 290, a performance of the NFC of the mobile device 10 may increase. In addition, since the NFC antenna emits an electromagnetic wave both in a direction of the back surface of the mobile device 10 through the loop antenna 290 and in a direction of the upper surface of the mobile device 10 through the first metal structure 211 that is exposed at the upper surface of the mobile device 10, a recognition range of the NFC of the mobile device 10 may be widened.

Figure 10:
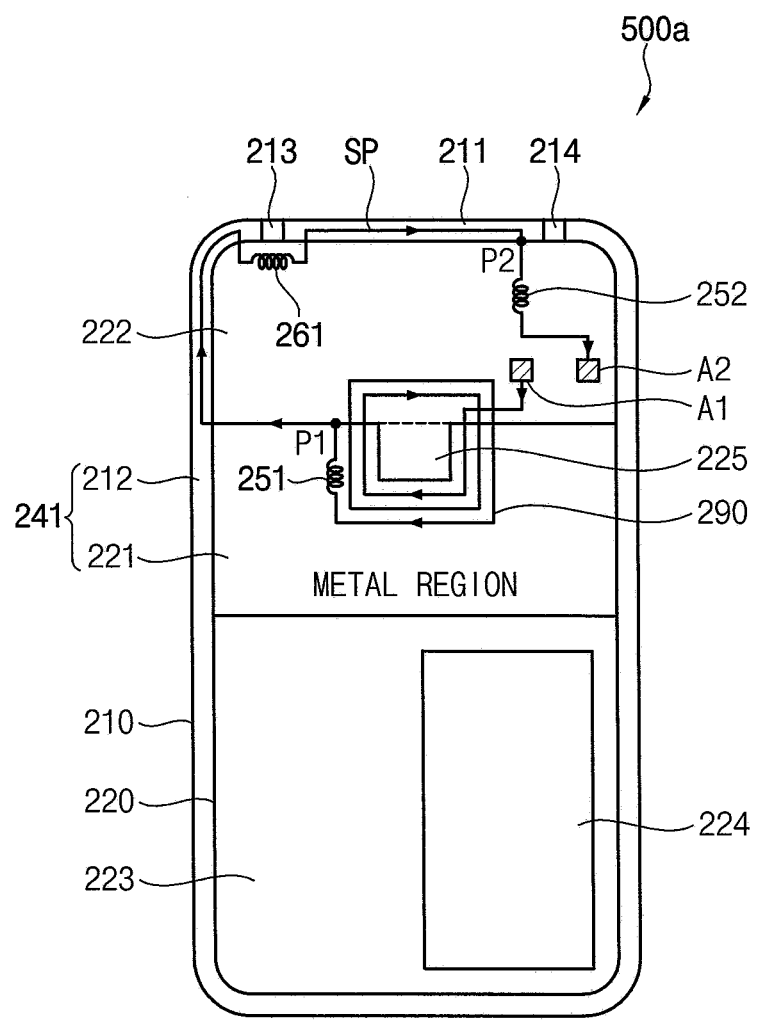

FIG. 10 is a diagram illustrating an example of the body case of FIG. 2.

A body case 500a of FIG. 10 may further include a first inductor 251 and a second inductor 252, compared to the body case 500 of FIG. 9.

Referring to FIG. 10, the first inductor 251 may be coupled between the first point P1 of the second metal structure 241 and the first end of the loop antenna 290. The second inductor 252 may be coupled between the second point P2 of the first metal structure 211 and the second antenna electrode A2.

In addition, the first antenna electrode A1 and the second antenna electrode A2 may be coupled to the NFC chip included in the mobile device 10.

Therefore, as illustrated in FIG. 10, a signal path SP (e.g., a current path), which includes the first antenna electrode A1, the loop antenna 290, the first inductor 251, at least a portion of the second metal structure 241, the connection inductor 261, at least a portion of the first metal structure 211, the second inductor 252, and the second antenna electrode A2, may be formed in the mobile device 10. Since the body case 500a and the loop antenna 290 have an inductance and a capacitance by forming the signal path SP between the first antenna electrode A1 and the second antenna electrode A2, the body case 500a and the loop antenna 290 may operate as a resonator having a desired resonance frequency suitable for the NFC. Therefore, the body case 500a and the loop antenna 290 may operate as the NFC antenna by emitting an electromagnetic wave through the signal path SP, based on a signal received from the NFC chip through the first antenna electrode A1 and the second antenna electrode A2.

Since the first inductor 251 and the second inductor 252 are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 500a and the loop antenna 290 may effectively reduce interference to the non-NFC that is performed by using the first metal region 211.

Figure 11:
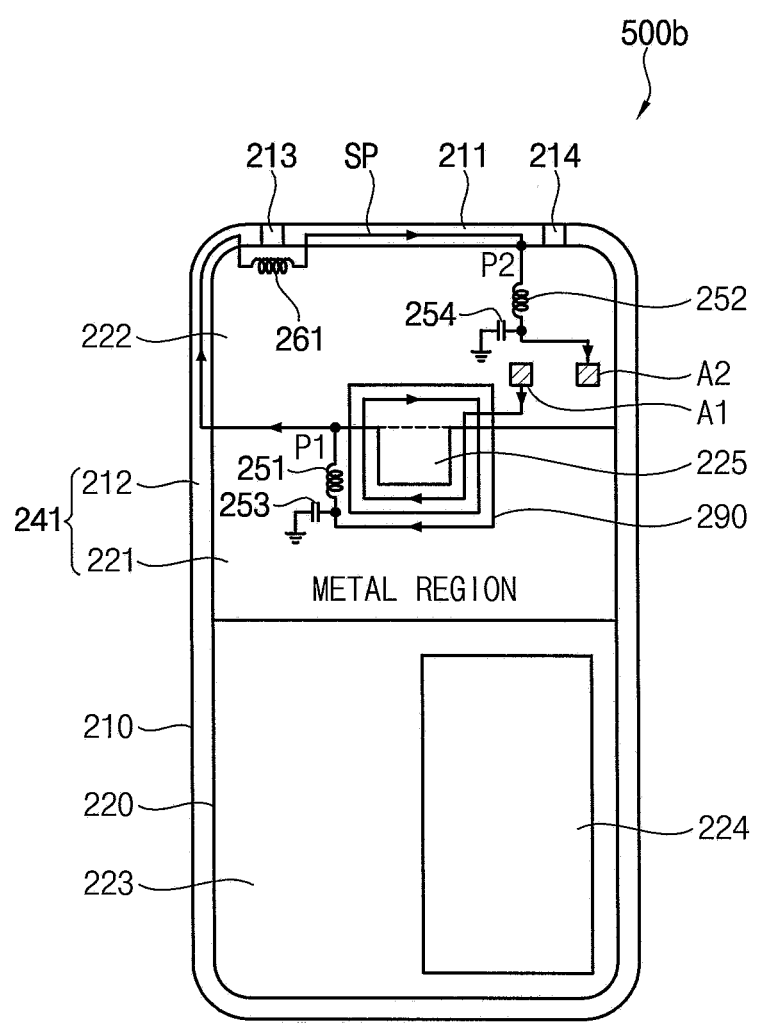

FIG. 11 is a diagram illustrating an example of the body case of FIG. 2.

A body case 500b of FIG. 11 may further include a first low pass filter and a second low pass filter, compared to the body case 500 of FIG. 9.

Referring to FIG. 11, the first low pass filter may be coupled between the first point P1 of the second metal structure 241 and the first end of the loop antenna 290. The second low pass filter may be coupled between the second point P2 of the first metal structure 211 and the second antenna electrode A2.

For example, the first low pass filter may include a first inductor 251 coupled between the first point P1 of the second metal structure 241 and the first end of the loop antenna 290, and a first capacitor 253 coupled between the first end of the loop antenna 290 and a ground voltage. In addition, the second low pass filter may include a second inductor 252 coupled between the second point P2 of the first metal structure 211 and the second antenna electrode A2, and a second capacitor 254 coupled between the second antenna electrode A2 and the ground voltage.

In addition, the first antenna electrode A1 and the second antenna electrode A2 may be coupled to the NFC chip included in the mobile device 10.

Therefore, as illustrated in FIG. 11, a signal path SP (e.g., a current path), which includes the first antenna electrode A1, the loop antenna 290, the first low pass filter including the first inductor 251 and the first capacitor 253, at least a portion of the second metal structure 241, the connection inductor 261, at least a portion of the first metal structure 211, the second low pass filter including the second inductor 252 and the second capacitor 254, and the second antenna electrode A2, may be formed in the mobile device 10. Since the body case 500b and the loop antenna 290 have an inductance and a capacitance by forming the signal path SP between the first antenna electrode A1 and the second antenna electrode A2, the body case 500b and the loop antenna 290 may operate as a resonator having a desired resonance frequency suitable for the NFC. Therefore, the body case 500b and the loop antenna 290 may operate as the NFC antenna by emitting an electromagnetic wave through the signal path SP, based on a signal received from the NFC chip through the first antenna electrode A1 and the second antenna electrode A2.

Since the first low pass filter and the second low pass filter are formed on the signal path SP, a signal component having a frequency (e.g., a higher frequency) other than an operating frequency (e.g., about 13.56 MHz) of the NFC may be blocked on the signal path SP. Therefore, the NFC antenna including the body case 500b and the loop antenna 290 may effectively reduce interference to the non-NFC that is performed by using the first metal region 211.

Figure 12:
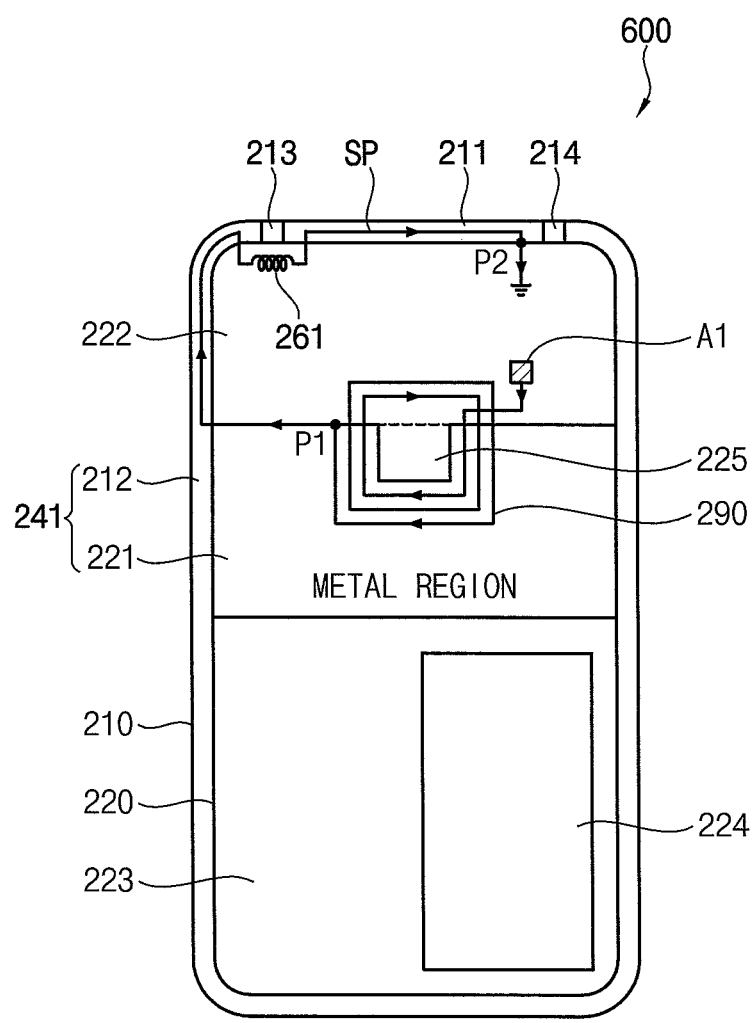

FIG. 12 is a diagram illustrating an example of the body case of FIG. 2.

A body case 600 of FIG. 12 shows an example of a connection between the loop antenna 290 and the body case 200 of FIG. 2. As will be described later, at least a portion of the body case 600 may operate as the NFC antenna together with the loop antenna 290.

Referring to FIG. 12, a first end of the loop antenna 290 may be coupled to the second metal structure 241 of the body case 600 at a first point P1. In addition, the first metal structure 211 may be coupled to a ground voltage at a second point P2.

The body case 600 may further include a first antenna electrode A1, which is coupled to a second end of the loop antenna 290, and a connection inductor 261 electrically connecting the first metal structure 211 and the second metal structure 241.

The first antenna electrode A1 may be coupled to the NFC chip included in the mobile device 10. In this case, the NFC antenna including the body case 600 and the loop antenna 290 may have a single ended structure.

Therefore, as illustrated in FIG. 12, a signal path SP (e.g., a current path), which includes the first antenna electrode A1, the loop antenna 290, at least a portion of the second metal structure 241, the connection inductor 261, at least a portion of the first metal structure 211, and the ground voltage, may be formed in the mobile device 10. Since the body case 600 and the loop antenna 290 have an inductance and a capacitance by forming the signal path SP between the first antenna electrode A1 and the ground voltage, the body case 600 and the loop antenna 290 may operate as a resonator having a desired resonance frequency suitable for the NFC. Therefore, the body case 600 and the loop antenna 290 may operate as the NFC antenna by emitting an electromagnetic wave through the signal path SP, based on a signal received from the NFC chip through the first antenna electrode A1.

As described above with reference to FIG. 12, since the NFC antenna including the body case 600 and the loop antenna 290 emits an electromagnetic wave through the body case 600 including a metal material in addition to emitting an electromagnetic wave through the loop antenna 290, a performance of the NFC of the mobile device 10 may increase. In addition, since the NFC antenna emits an electromagnetic wave both in a direction of the back surface of the mobile device 10 through the loop antenna 290 and in a direction of the upper surface of the mobile device 10 through the first metal structure 211 that is exposed at the upper surface of the mobile device 10, a recognition range of the NFC of the mobile device 10 may be widened.

Figure 13:
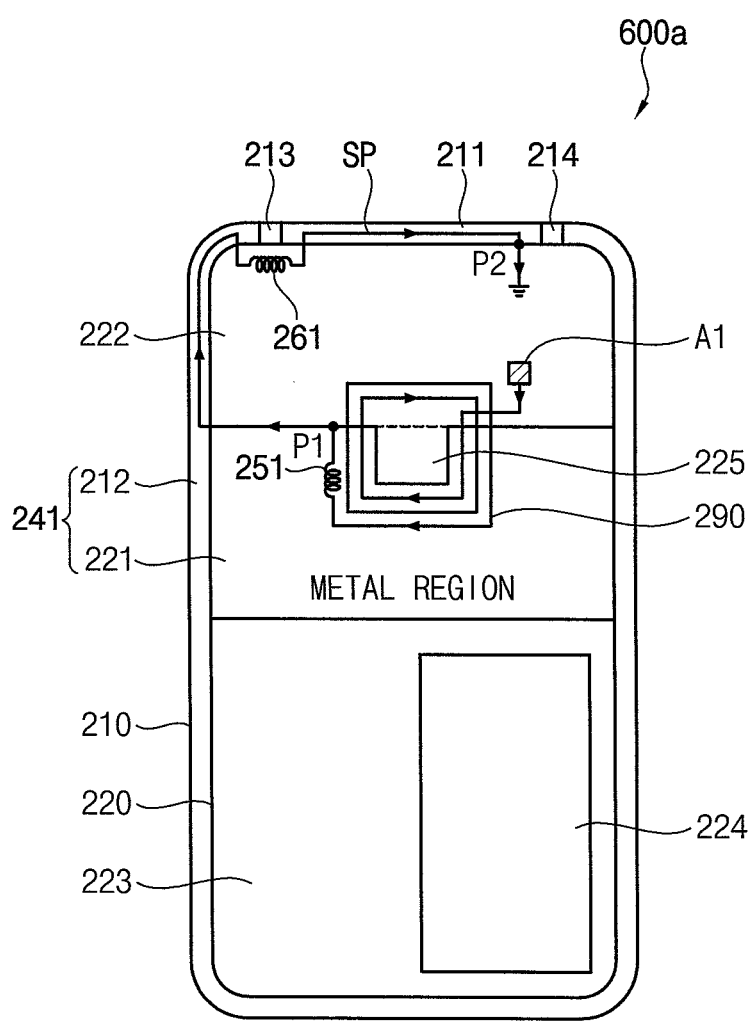

FIG. 13 is a diagram illustrating an example of the body case of FIG. 2.

A body case 600a of FIG. 13 may further include a first inductor 251, compared to the body case 600 of FIG. 12.

Referring to FIG. 13, the first inductor 251 may be coupled between the first point P1 of the second metal structure 241 and the first end of the loop antenna 290.

In addition, the first antenna electrode A1 may be coupled to the NFC chip included in the mobile device 10.

Therefore, as illustrated in FIG. 13, a signal path SP (e.g., a current path), which includes the first antenna electrode A1, the loop antenna 290, the first inductor 251, at least a portion of the second metal structure 241, the connection inductor 261, at least a portion of the first metal structure 211, and the ground voltage, may be formed in the mobile device 10. Since the body case 600a and the loop antenna 290 have an inductance and a capacitance by forming the signal path SP between the first antenna electrode A1 and the ground voltage, the body case 600a and the loop antenna 290 may operate as a resonator having a desired resonance frequency suitable for the NFC. Therefore, the body case 600a and the loop antenna 290 may operate as the NFC antenna by emitting an electromagnetic wave through the signal path SP, based on a signal received from the NFC chip through the first antenna electrode A1.

Since the first inductor 251 is formed on the signal path SP, a signal component having a frequency (e.g., a higher frequency) other than an operating frequency (e.g., about 13.56 MHz) of the NFC may be blocked on the signal path SP. Therefore, the NFC antenna including the body case 600a and the loop antenna 290 may effectively reduce interference to the non-NFC that is performed by using the first metal region 211.

Figure 14:
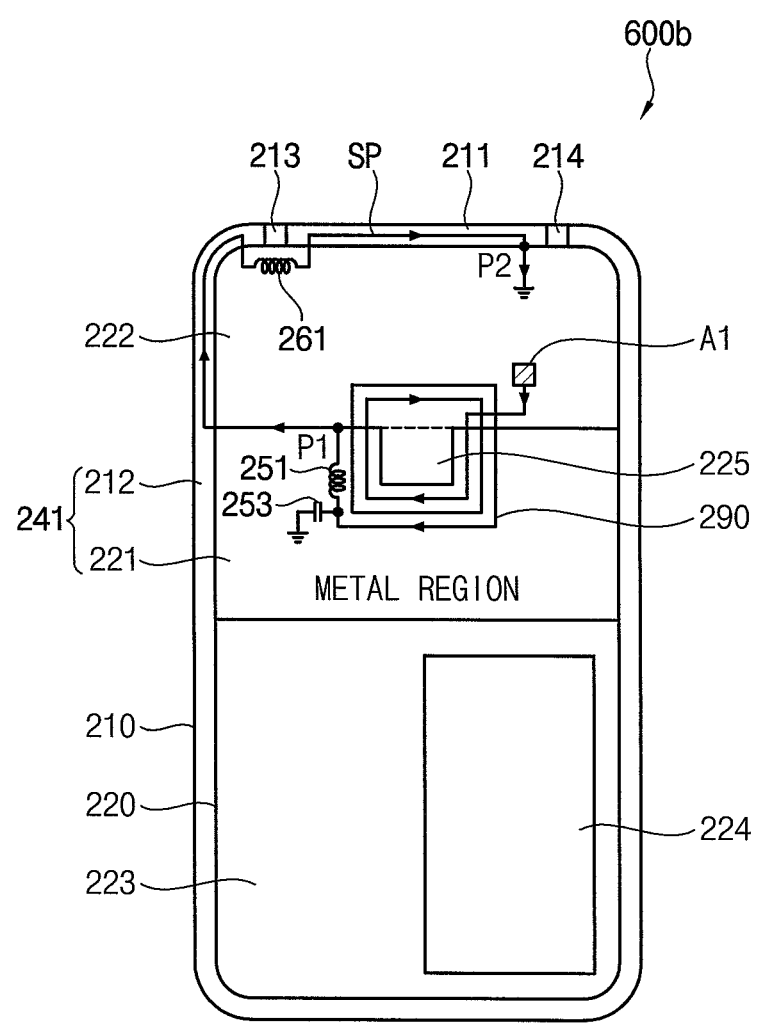

FIG. 14 is a diagram illustrating an example of the body case of FIG. 2.

A body case 600b of FIG. 14 may further include a first low pass filter, compared to the body case 500 of FIG. 12.

Referring to FIG. 14, the first low pass filter may be coupled between the first point P1 of the second metal structure 241 and the first end of the loop antenna 290.

For example, the first low pass filter may include a first inductor 251 coupled between the first point P1 of the second metal structure 241 and the first end of the loop antenna 290, and a first capacitor 253 coupled between the first end of the loop antenna 290 and a ground voltage.

In addition, the first antenna electrode A1 may be coupled to the NFC chip included in the mobile device 10.

Therefore, as illustrated in FIG. 14, a signal path SP (e.g., a current path), which includes the first antenna electrode A1, the loop antenna 290, the first low pass filter including the first inductor 251 and the first capacitor 253, at least a portion of the second metal structure 241, the connection inductor 261, at least a portion of the first metal structure 211, and the ground voltage, may be formed in the mobile device 10. Since the body case 600b and the loop antenna 290 have an inductance and a capacitance by forming the signal path SP between the first antenna electrode A1 and the ground voltage, the body case 600b and the loop antenna 290 may operate as a resonator having a desired resonance frequency suitable for the NFC. Therefore, the body case 600b and the loop antenna 290 may operate as the NFC antenna by emitting an electromagnetic wave through the signal path SP, based on a signal received from the NFC chip through the first antenna electrode A1.

Since the first low pass filter is formed on the signal path SP, a signal component having a frequency (e.g., a higher frequency) other than an operating frequency (e.g., about 13.56 MHz) of the NFC may be blocked on the signal path SP. Therefore, the NFC antenna including the body case 600*b* and the loop antenna 290 may effectively reduce interference to the non-NFC that is performed by using the first metal region 211.

Figure 15:
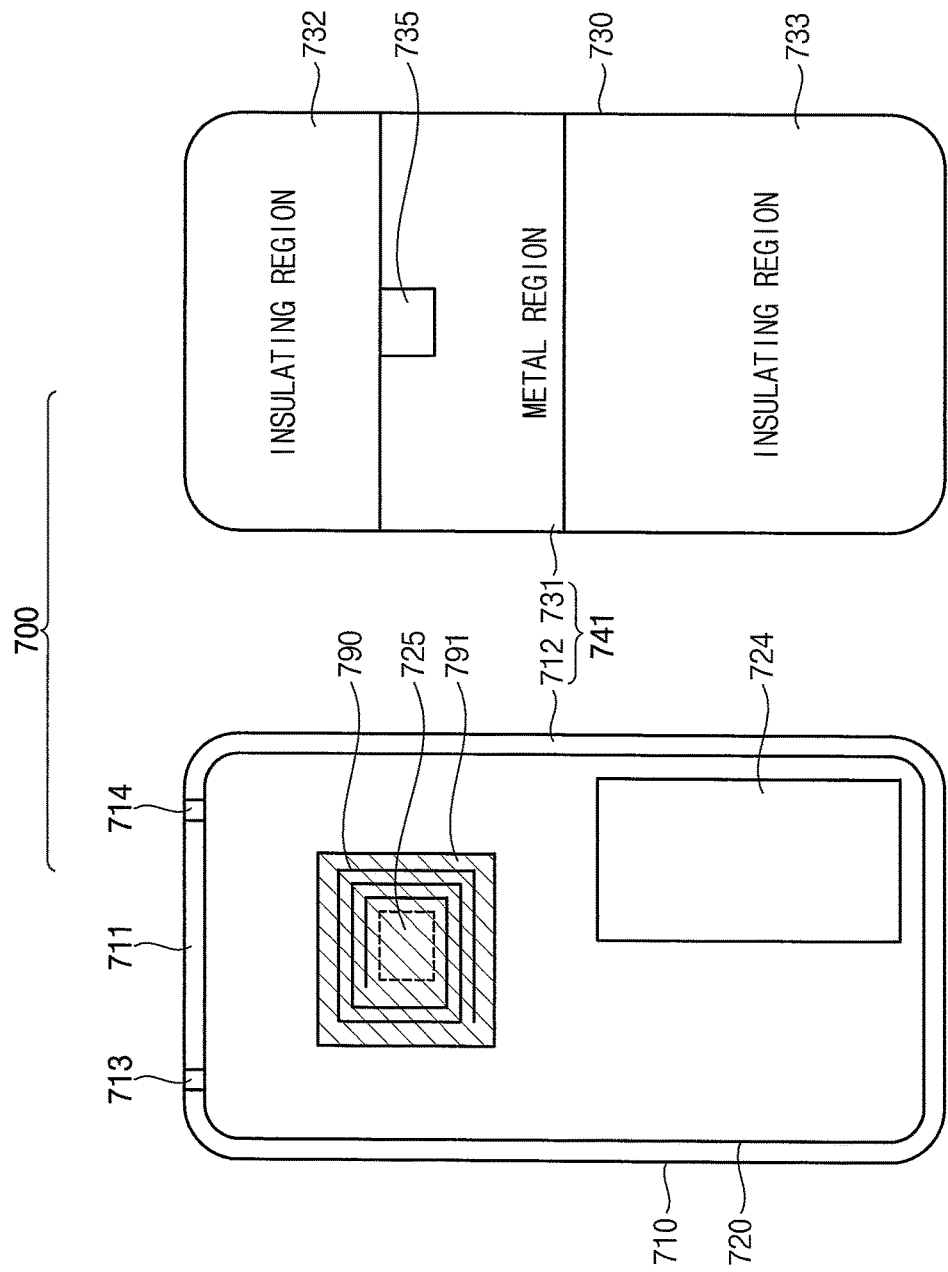
FIG. 15 is a diagram illustrating a body case of a mobile device according to example embodiments.

FIG. 15 is a diagram illustrating a body case of a mobile device according to example embodiments.

The body case 120 included in the mobile device 10 of FIG. 1 may be implemented with a body case 700 of FIG. 15. Therefore, FIG. 15 may represent a back surface and sidewalls of the mobile device 10 of FIG. 1.

Referring to FIG. 15, the body case 700 may include a frame 710 defining a perimeter of the mobile device 10, a back surface part 720 disposed at a first surface (e.g., the back surface) of the mobile device 10 that is opposite to a second surface (e.g., the front surface) of the mobile device 10 at which the display device 110 is disposed, and a back surface cover 730 covering the back surface part 220. The frame 710 may not be disposed at a same level as the back surface part 720. For example, the frame 710 may be positioned to form a certain angle (e.g., 90 degrees) with respect to the back surface part 720.

In some example embodiments, the back surface cover 730 may not be detached from the back surface part 720. For example, the back surface cover 730 and the back surface part 720 may be integrally formed to have an integral structure. In other examples, the back surface cover 730 and the back surface part 720 may be separately formed, and then be bonded to each other such that the back surface cover 730 is not detached from the back surface part 720.

In other example embodiments, the back surface cover 730 may be detachably attached to the back surface part 720. For example, the back surface cover 730 may be detached from the back surface part 720 to change a battery of the mobile device 10, and then be attached to the back surface part 720 after the battery is changed.

To describe a structure of the back surface part 720, FIG. 15 illustrates the body case 700 in which the back surface cover 730 is detached from the back surface part 720.

The frame 710 may form a sidewall of the mobile device 10, and support the display device 110 disposed at the front surface of the mobile device 10. The NFC chip and the non-NFC chip included in the mobile device 10 may be embedded in the frame 710.

The frame 710 may include a first metal region 711, a second metal region 712, and insulating regions 713 and 714. The insulating regions 713 and 714 may be disposed between the first metal region 711 and the second metal region 712 to electrically insulate the first metal region 711 and the second metal region 712.

The first metal region 711 and the second metal region 712 may include a metal material having a desired strength and a desired electrical conductivity. For example, the first metal region 711 and the second metal region 712 may include at least one of copper (Cu), aluminum (Al), iron (Fe), titanium (Ti), silver (Ag), palladium (Pd), platinum (Pt), aurum (Au), nickel (Ni) and the like.

The insulating regions 713 and 714 may include an insulating material. For example, the insulating regions 713 and 714 may include a polyimide, a plastic, a polymer, a ceramic, a glass, or the like.

As illustrated in FIG. 15, the first metal region 711 of the frame 710 may be exposed at a first side of the mobile device 10. For example, the first metal region 711 of the frame 710 may be exposed at an upper surface of the mobile device 10. In addition, the first metal region 711 may operate as an antenna for the non-NFC. That is, the first metal region 711 may correspond to the non-NFC antenna. The non-NFC may include a cellular telephone communication, such as a long term evolution (LTE) communication, a wideband code division multiple access (WCDMA) communication, etc., a wireless local area network (WLAN) communication, a global positioning system (GPS) communication, a Bluetooth communication, or the like. A length of the first metal region 711, which is defined by the insulating regions 713 and 714, may be determined based on a frequency band of the non-NFC. Hereinafter, the first metal region 711 of the frame 710 is also referred to as a first metal structure 711.

The back surface part 720 may be disposed at the back surface of the mobile device 10 that is opposite to the front surface of the mobile device 10 at which the display device 110 is disposed. The back surface part 720 may be connected to the frame 710, such that semiconductor devices included in the mobile device 10 (e.g., the NFC chip and the non-NFC chip) may be located in a space formed by the display device 110, the frame 710, and the back surface part 720.

In some example embodiments, the back surface part 720 may include an insulating material.

According to example embodiments, the back surface part 720 may include a camera hole 725 that exposes a camera module (e.g., a camera) of the mobile device 10. In this case, the back surface cover 730 may also have a camera hole 735 that, when the back surface cover 730 is attached to the back surface part 720, faces the camera hole 725 of the back surface part 720 and exposes the camera module of the mobile device 10 therethrough. In addition, the back surface part 720 may further include a battery installation area 724 in which a battery of the mobile device 10 is installed.

In some example embodiments, the back surface cover 730 may include a metal region 731 and an insulating region 732.

When the back surface cover 730 is attached to the back surface part 720, the metal region 731 of the back surface cover 730 may be electrically connected to the second metal region 712 of the frame 710. For example, the metal region 731 may include at least one of copper (Cu), aluminum (Al), iron (Fe), titanium (Ti), silver (Ag), palladium (Pd), platinum (Pt), aurum (Au), nickel (Ni) and the like. The metal region 731 of the back surface cover 730 and the second metal region 712 of the frame 710 may form a second metal structure 741.

When the back surface cover 730 is attached to the back surface part 720, the insulating region 732 of the back surface cover 730 may electrically insulate the metal region 731 of the back surface cover 730 and the first metal region 711 of the frame 710. For example, the insulating region 732 may include a polyimide, a plastic, a polymer, a ceramic, a glass, or the like.

The back surface cover 730 may further include an insulating region 733 disposed at a lower portion of the back surface cover 730.

The mobile device 10 may include a loop antenna 790 electrically connected to the body case 700. The loop antenna 790 may be electrically connected to at least one of the first metal structure 711 and the second metal structure 741 of the body case 700.

Although the loop antenna 790 is illustrated to be disposed around the camera hole 725 in FIG. 15, a location of the loop antenna 790 is not limited thereto. For example, the loop antenna 790 may be attached to a battery of the mobile device 10 or on an inside of the back surface cover 730.

Hereinafter, for ease of explanation, the loop antenna 790 is assumed to be disposed around the camera hole 725.

As will be described later, the mobile device 10 may perform the NFC using a signal path including the loop antenna 790 and at least a portion of the first metal structure 711 and the second metal structure 741 of the body case 700. That is, the loop antenna 790 and at least a portion of the first metal structure 711 and the second metal structure 741 of the body case 700 may operate as an antenna for the NFC.

In addition, the body case 700 may further include an inductor or a low pass filter formed on the signal path including the loop antenna 790 and at least a portion of the first metal structure 711 and the second metal structure 741. The inductor or the low pass filter formed on the signal path may block a signal component having a frequency other than an operating frequency (e.g., about 13.56 MHz) of the NFC, thereby reducing interference to the non-NFC that is performed by using the first metal region 711.

In some example embodiments, the body case 700 may further include a magnetic sheet 791 disposed under the loop antenna 790. For example, the magnetic sheet 791 may be a ferrite sheet or a magneto-dielectric material (MDM) sheet. The magnetic sheet 791 may improve electromagnetic wave radiation efficiency.

The body case 700 of FIG. 15 may be the same as the body case 200 of FIG. 2 except that the second metal structure 741 of the body case 700 of FIG. 15 includes the second metal region 712 of the frame 710 and the metal region 731 of the back surface cover 730 that is electrically connected to the second metal region 712 of the frame 710 while the second metal structure 241 of the body case 200 of FIG. 2 includes the second metal region 212 of the frame 210 and the metal region 221 of the back surface part 220 that is electrically connected to the second metal region 212 of the frame 210.

Therefore, the loop antenna 790 may be connected to at least one of the first metal structure 711 and the second metal structure 741 of the body case 700 in the same way described above with reference to FIGS. 3 to 14, such that the body case 700 and the loop antenna 790 may operate as the NFC antenna.

Figure 16:
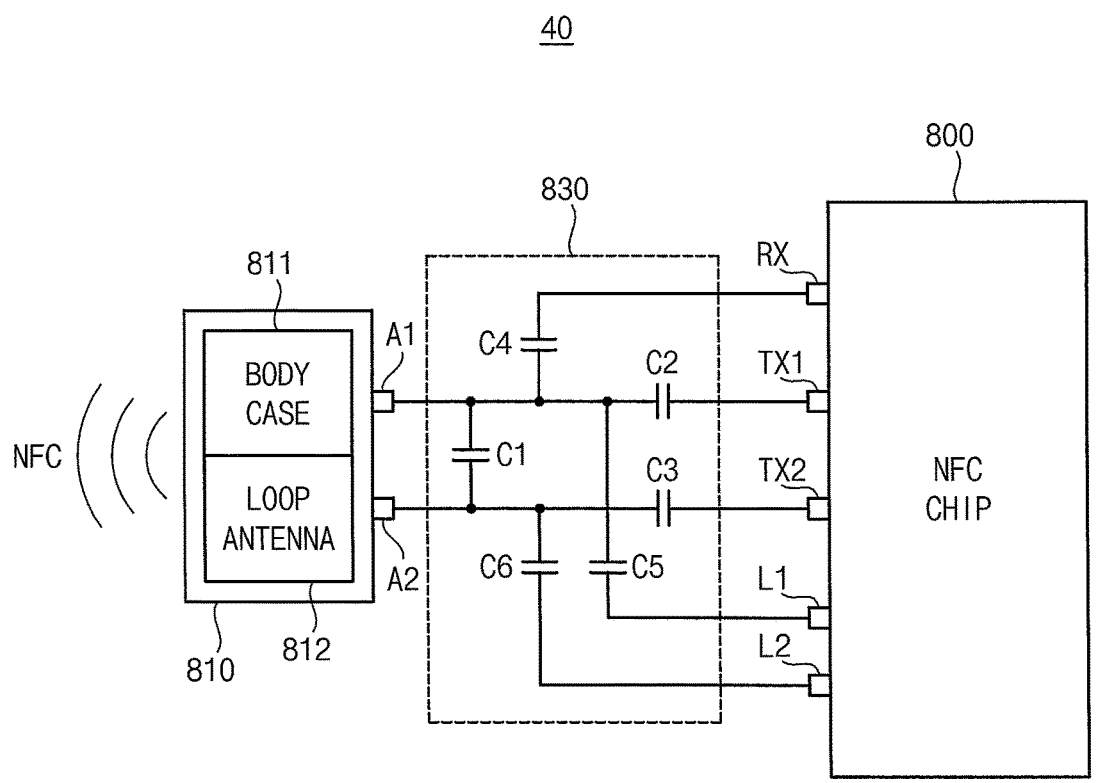
FIG. 16 is a block diagram illustrating a near field communication (NFC) device included in a mobile device according to example embodiments.

FIG. 16 is a block diagram illustrating a near field communication (NFC) device included in a mobile device according to example embodiments.

An NFC device 40 of FIG. 16 may be included in the mobile device 10 of FIG. 1.

Referring to FIG. 16, the NFC device 40 may include an NFC chip 800, an NFC antenna 810, and a matching circuit 830.

The NFC chip 800 may output an NFC signal.

The NFC antenna 810 may emit an electromagnetic wave corresponding to the NFC signal through a body case 811 and a loop antenna 812 electrically connected to the body case 811. The body case 811 may surround the display device 110 located at the front surface of the mobile device 10, embed the NFC chip 800, and include a metal material. In addition, the NFC antenna 810 may be coupled to the matching circuit 830 through a first antenna electrode A1 and a second antenna electrode A2.

The NFC antenna 810 included in the NFC device 40 of FIG. 16 may be implemented with any one of the NFC antennas described above with reference to FIGS. 3 to 11.

Therefore, since the NFC antenna 810 including the body case 811 and the loop antenna 812 emits an electromagnetic wave through the body case 811 including a metal material in addition to emitting an electromagnetic wave through the loop antenna 812, a performance of the NFC of the NFC device 40 may increase. In addition, since the NFC antenna 810 emits an electromagnetic wave both in a direction of the back surface of the mobile device 10 through the loop antenna 812 and in a direction of the upper surface of the mobile device 10 through at least a portion of the body case 811 (e.g., the first metal structure 211) that is exposed at the upper surface of the mobile device 10, a recognition range of the NFC of the NFC device 40 may be widened.

The NFC chip 800 and the matching circuit 830 may be embedded in the body case 811.

The matching circuit 830 may be coupled between the NFC antenna 810 and the NFC chip 800. For example, the matching circuit 830 may be coupled to the NFC antenna 810 through the first antenna electrode A1 and the second antenna electrode A2, and be coupled to the NFC chip 800 through a first transmission electrode TX1, a second transmission electrode TX2, a reception electrode RX, a first power electrode L1, and a second power electrode L2. The matching circuit 830 may perform an impedance matching between the NFC antenna 810 and the NFC chip 800.

In some example embodiments, the matching circuit 830 may include a first capacitor C1, a second capacitor C2, a third capacitor C3, a fourth capacitor C4, a fifth capacitor C5, and a sixth capacitor C6. The first capacitor C1 may be coupled between the first antenna electrode A1 and the second antenna electrode A2. The first capacitor C1 may form a resonance circuit together with the NFC antenna 810. A resonance frequency of the NFC device 40 may be adjusted to a desired frequency (e.g., 13.56 MHz) by controlling a capacitance of the first capacitor C1. The second capacitor C2 may be coupled between the first antenna electrode A1 and the first transmission electrode TX1. The third capacitor C3 may be coupled between the second antenna electrode A2 and the second transmission electrode TX2. The fourth capacitor C4 may be coupled between the first antenna electrode A1 and the reception electrode RX. According to example embodiments, the fourth capacitor C4 may be coupled between the second antenna electrode A2 and the reception electrode RX. The fifth capacitor C5 may be coupled between the first antenna electrode A1 and the first power electrode L1. The sixth capacitor C6 may be coupled between the second antenna electrode A2 and the second power electrode L2. However, the matching circuit 830 of FIG. 16 is only an example. According to example embodiments, the matching circuit 830 may be implemented in various structures to perform an impedance matching between the NFC antenna 810 and the NFC chip 800.

In a reader mode, the NFC chip 800 may generate a transmission signal, and provide the transmission signal to the NFC antenna 810 through the matching circuit 830. The NFC antenna 810 may emit an electromagnetic wave based on the transmission signal to communicate data with an external NFC card. When the external NFC card that includes a resonance circuit including an antenna having an inductance component and a resonance capacitor is near the NFC device 40 while the NFC antenna 810 of the NFC device 40 emits the electromagnetic wave, a mutual induction may occur between the NFC antenna 810 and the external NFC card. Therefore, the external NFC card may receive the transmission signal by demodulating a signal generated by the mutual induction.

In a card mode, the NFC device 40 may communicate data with an external NFC reader using an electromagnetic wave emitted by the external NFC reader. That is, a mutual induction may occur between the NFC antenna 810 and the external NFC reader based on the electromagnetic wave emitted by the external NFC reader. Therefore, the NFC antenna 810 may provide an antenna voltage, which is generated at the first antenna electrode A1 and the second antenna electrode A2 through the mutual induction, to the NFC chip 800 through the matching circuit 830. The NFC chip 800 may receive data transmitted by the external NFC reader by demodulating the antenna voltage.

Figure 17:
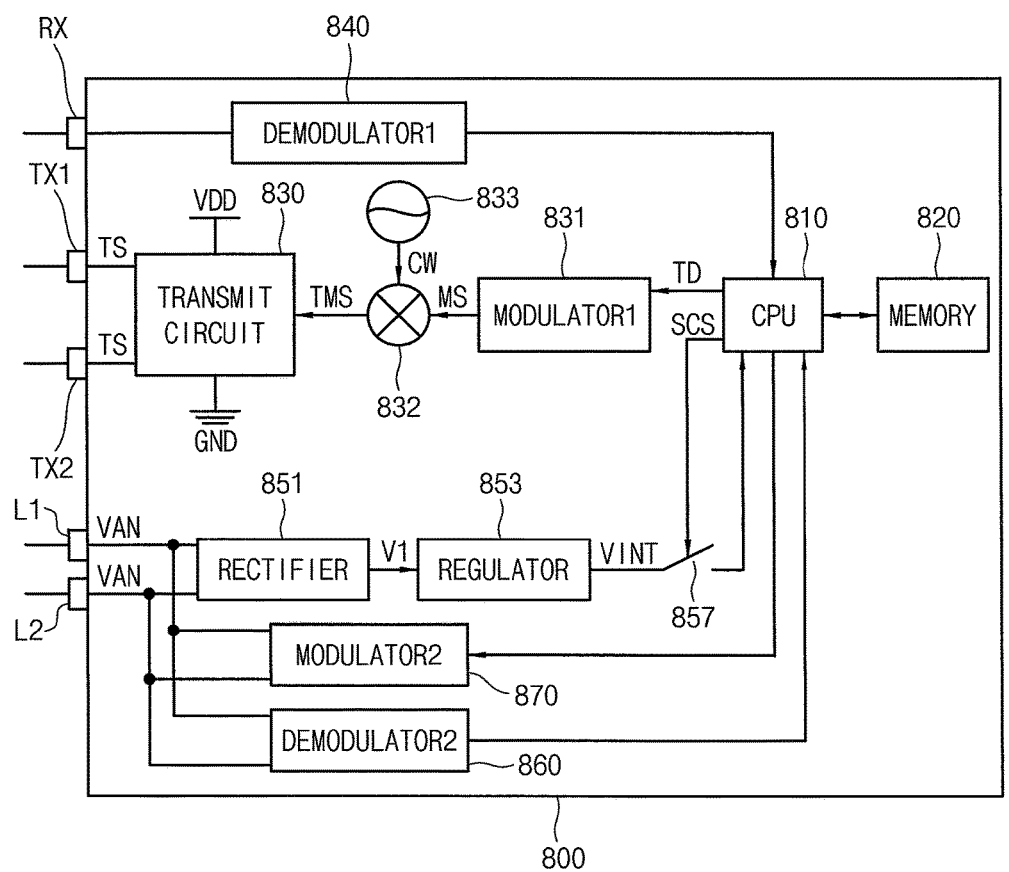
FIG. 17 is a block diagram illustrating an example of an NFC chip included in the NFC device of FIG. 16.

FIG. 17 is a block diagram illustrating an example of an NFC chip included in the NFC device of FIG. 16.

Referring to FIG. 17, the NFC chip 800 may include a central processing unit (CPU) 810, a memory device 820, a first modulator 831, a mixer 832, an oscillator 833, a transmit circuit 830, a first demodulator 840, a rectifier 851, a regulator 853, a power switch 857, a second demodulator 860, and a second modulator 870.

When the NFC chip 800 performs a transmit operation in the reader mode, the CPU 810 may read out output data TD from the memory device 820 to provide the output data TD to the first modulator 831, the first modulator 831 may modulate the output data TD to generate a modulation signal MS, the oscillator 833 may generate a carrier signal CW having a carrier frequency (e.g., 13.56 MHz), and the mixer 832 may generate a transmission modulation signal TMS by synthesizing the carrier signal CW with the modulation signal MS.

The transmit circuit 830 may be coupled between a supply voltage VDD and a ground voltage GND.

The transmit circuit 830 may output the transmission signal TS, which corresponds to the transmission modulation signal TMS received from the mixer 832, through the first transmission electrode TX1 and the second transmission electrode TX2. The NFC antenna 810 may emit an electromagnetic wave based on the transmission signal TS.

In some example embodiments, the transmit circuit 830 may output the transmission signal TS corresponding to the transmission modulation signal TMS through the first transmission electrode TX1 and the second transmission electrode TX2 by connecting the first transmission electrode TX1 and the second transmission electrode TX2 to the supply voltage VDD through a pull-up load, or to the ground voltage GND through a pull-down load based on the transmission modulation signal TMS.

For example, the transmit circuit 830 may connect the first transmission electrode TX1 to the supply voltage VDD through the pull-up load and connect the second transmission electrode TX2 to the ground voltage GND through the pull-down load, or connect the first transmission electrode TX1 to the ground voltage GND through the pull-down load and connect the second transmission electrode TX2 to the supply voltage VDD through the pull-up load based on the transmission modulation signal TMS. In this manner, the transmit circuit 830 may output the transmission signal TS corresponding to the transmission modulation signal TMS through the first transmission electrode TX1 and the second transmission electrode TX2.

When the transmit circuit 830 connects the first transmission electrode TX1 to the supply voltage VDD through the pull-up load and connects the second transmission electrode TX2 to the ground voltage GND through the pull-down load, an output current may be generated from the supply voltage VDD, provided to the matching circuit 830 and the NFC antenna 810 through the first transmission electrode TX1, and sunk to the ground voltage GND through the second transmission electrode TX2.

When the transmit circuit 830 connects the first transmission electrode TX1 to the ground voltage GND through the pull-down load and connects the second transmission electrode TX2 to the supply voltage VDD through the pull-up load, the output current may be generated from the supply voltage VDD, provided to the matching circuit 830 and the NFC antenna 810 through the second transmission electrode TX2, and sunk to the ground voltage GND through the first transmission electrode TX1.

Figure 18:
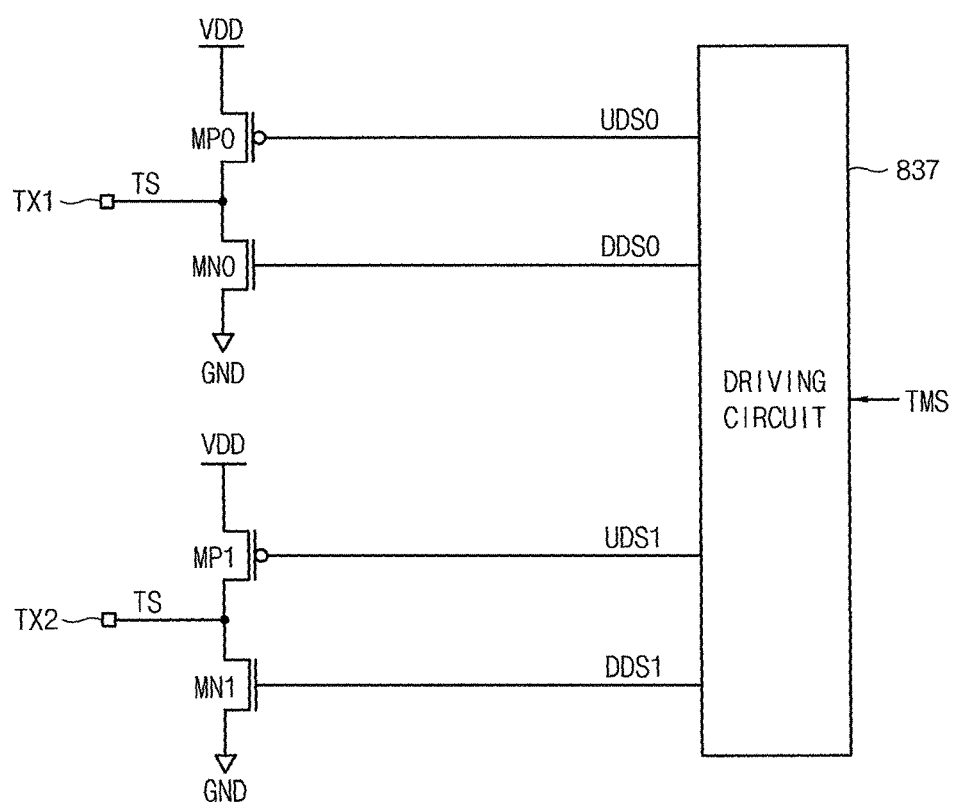
FIG. 18 is a block diagram illustrating an example of a transmit circuit included in the NFC chip of FIG. 17.

FIG. 18 is a block diagram illustrating an example of a transmit circuit included in the NFC chip of FIG. 17.

Referring to FIG. 18, the transmit circuit 830 may include a first pull-up transistor MP0, a second pull-up transistor MP1, a first pull-down transistor MN0, a second pull-down transistor MN1, and a driving circuit 837.

The first pull-up transistor MP0 and the second pull-up transistor MP1 may be p-type metal oxide semiconductor (PMOS) transistors. The first pull-down transistor MN0 and the second pull-down transistor MN1 may be n-type metal oxide semiconductor (NMOS) transistors.

The first pull-up transistor MP0 may be coupled between the supply voltage VDD and the first transmission electrode TX1, and the first pull-down transistor MN0 may be coupled between the first transmission electrode TX1 and the ground voltage GND.

The second pull-up transistor MP1 may be coupled between the supply voltage VDD and the second transmission electrode TX2, and the second pull-down transistor MN1 may be coupled between the second transmission electrode TX2 and the ground voltage GND.

The driving circuit 837 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving circuit 837 may turn on one of the first pull-up transistor MP0 and the first pull-down transistor MN0 and turn on one of the second pull-up transistor MP1 and the second pull-down transistor MN1 based on the transmission modulation signal TMS received from the mixer 832.

For example, the driving circuit 837 may turn on the first pull-up transistor MP0 and the second pull-down transistor MN1 and turn off the second pull-up transistor MP1 and the first pull-down transistor MN0, or turn on the second pull-up transistor MP1 and the first pull-down transistor MN0 and turn off the first pull-up transistor MP0 and the second pull-down transistor MN1 based on the transmission modulation signal TMS to output the transmission signal TS through the first transmission electrode TX1 and the second transmission electrode TX2, based on the transmission modulation signal TMS.

Referring again to FIG. 17, as described above, in the reader mode, the NFC antenna 810 may communicate data with the external NFC card by emitting an electromagnetic wave. When the external NFC card that includes a resonance circuit including an antenna having an inductance component and a resonance capacitor is near the NFC device 40 while the NFC antenna 810 of the NFC device 40 emits the electromagnetic wave, a mutual induction may occur between the NFC antenna 810 and the external NFC card. Therefore, an antenna voltage may be generated at the first antenna electrode A1 and the second antenna electrode A2 through the mutual induction.

The antenna voltage generated in the reader mode may be provided to the NFC chip 800 through the fourth capacitor C4 and the reception electrode RX as a reception signal.

When the NFC chip 800 performs a receive operation in the reader mode, the first demodulator 840 included in the NFC chip 800 may generate input data by demodulating the reception signal received through the reception electrode RX, and provide the input data to the CPU 810. The CPU 810 may store the input data in the memory device 820.

As described above, in the card mode, the NFC device 40 may communicate data with the external NFC reader using an electromagnetic wave emitted by the external NFC reader. That is, a mutual induction may occur between the NFC antenna 810 and the external NFC reader based on the electromagnetic wave emitted by the external NFC reader. Therefore, an antenna voltage VAN may be generated at the first antenna electrode A1 and the second antenna electrode A2 through the mutual induction.

The antenna voltage VAN may be transferred to the first power electrode L1 and the second power electrode L2 through the fifth capacitor C5 and the sixth capacitor C6, respectively.

The rectifier 851 may generate a first voltage V1, which is a direct voltage, by rectifying the antenna voltage VAN received through the first power electrode L1 and the second power electrode L2.

The regulator 853 may generate an internal voltage VINT, which has a voltage level of a predetermined magnitude usable in the NFC chip 800, using the first voltage V1.

The CPU 810 may control the overall operation of the NFC chip 800. The CPU 810 may operate using the supply voltage VDD provided by a power source, such as a battery. In addition, the CPU 810 may receive the internal voltage VINT from the regulator 853 through the power switch 857. When the supply voltage VDD is equal to or higher than a predetermined voltage level, the CPU 810 may operate using the supply voltage VDD and disable a switch control signal SCS to turn off the power switch 857. When the supply voltage VDD is lower than the predetermined voltage level, the CPU 810 may enable the switch control signal SCS to turn on the power switch 857 such that the CPU 810 may operate using the internal voltage VINT provided by the regulator 853.

When the NFC chip 800 performs the receive operation in the card mode, the second demodulator 860 may generate input data by demodulating a signal received through the first power electrode L1 and the second power electrode L2, and provide the input data to the CPU 810. The CPU 810 may store the input data in the memory device 820.

When the NFC chip 800 performs the transmit operation in the card mode, the CPU 810 may read out output data from the memory device 820 to provide the output data to the second modulator 870, and the second modulator 870 may modulate the output data to output a modulation signal through the first power electrode L1 and the second power electrode L2. For instance, the second modulator 870 may generate the modulation signal by performing a load modulation on the output data. The NFC antenna 810 may transmit the output data to the external NFC reader by causing a mutual induction between the NFC antenna 810 and the external NFC reader based on the modulation signal.

Although an example of the NFC chip 800 included in the NFC device 40 of FIG. 16 is described above with reference to FIGS. 17 and 18, example embodiments are not limited thereto. According to example embodiments, the NFC chip 800 may be implemented in various structures.

Figure 19:
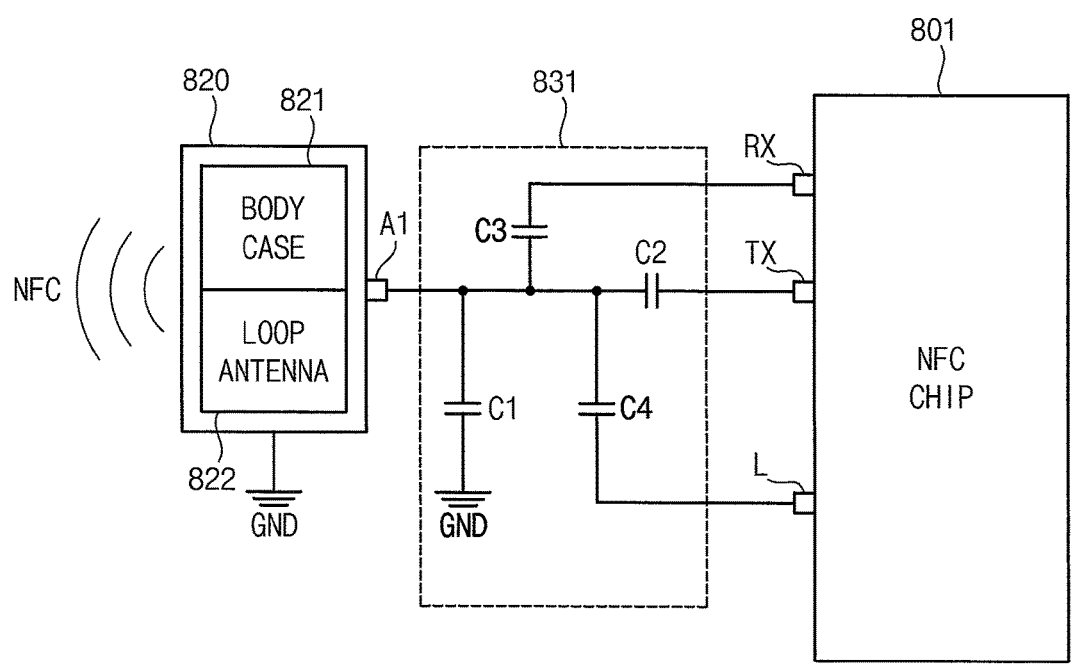
FIG. 19 is a block diagram illustrating an NFC device included in a mobile device according to example embodiments.

FIG. 19 is a block diagram illustrating an NFC device included in a mobile device according to example embodiments.

An NFC device 50 of FIG. 19 may be included in the mobile device 10 of FIG. 1.

Referring to FIG. 19, the NFC device 50 may include an NFC chip 801, an NFC antenna 820, and a matching circuit 831.

The NFC chip 801 may output an NFC signal.

The NFC antenna 820 may emit an electromagnetic wave corresponding to the NFC signal through a body case 821 and a loop antenna 822 electrically connected to the body case 821. The body case 821 surrounds the display device 110 located at the front surface of the mobile device 10, embeds the NFC chip 801, and includes a metal material. In addition, the NFC antenna 820 may be coupled between a first antenna electrode A1 and a ground voltage GND, and be coupled to the matching circuit 831 through the first antenna electrode A1.

The NFC antenna 820 included in the NFC device 50 of FIG. 19 may be implemented with any one of the NFC antennas described above with reference to FIGS. 12 to 14.

Therefore, since the NFC antenna 820 including the body case 821 and the loop antenna 822 emits an electromagnetic wave through the body case 821 including a metal material in addition to emitting an electromagnetic wave through the loop antenna 822, a performance of the NFC of the NFC device 50 may increase. In addition, since the NFC antenna 820 emits an electromagnetic wave both in a direction of the back surface of the mobile device 10 through the loop antenna 822 and in a direction of the upper surface of the mobile device 10 through at least a portion of the body case 821 (e.g., the first metal structure 211) that is exposed at the upper surface of the mobile device 10, a recognition range of the NFC of the NFC device 50 may be widened.

The NFC chip 801 and the matching circuit 831 may be embedded in the body case 821.

The matching circuit 831 may be coupled between the NFC antenna 820 and the NFC chip 801. For example, the matching circuit 831 may be coupled to the NFC antenna 820 through the first antenna electrode A1, and be coupled to the NFC chip 801 through a transmission electrode TX, a reception electrode RX, and a power electrode L. The matching circuit 831 may perform an impedance matching between the NFC antenna 820 and the NFC chip 801.

In some example embodiments, the matching circuit 831 may include a first capacitor C1, a second capacitor C2, a third capacitor C3, and a fourth capacitor C4. The first capacitor C1 may be coupled between the first antenna electrode A1 and the ground voltage GND. The first capacitor C1 may form a resonance circuit together with the NFC antenna 820. A resonance frequency of the NFC device 50 may be adjusted to a desired frequency (e.g., 13.56 MHz) by controlling a capacitance of the first capacitor C1. The second capacitor C2 may be coupled between the first antenna electrode A1 and the transmission electrode TX. The third capacitor C3 may be coupled between the first antenna electrode A1 and the reception electrode RX. The fourth capacitor C4 may be coupled between the first antenna electrode A1 and the power electrode L. However, the matching circuit 831 of FIG. 19 is only an example. According to example embodiments, the matching circuit 831 may be implemented in various structures to perform an impedance matching between the NFC antenna 820 and the NFC chip 801.

In a reader mode, the NFC chip 801 may generate a transmission signal, and provide the transmission signal to the NFC antenna 820 through the matching circuit 831. The NFC antenna 820 may emit an electromagnetic wave based on the transmission signal to communicate data with an external NFC card. When the external NFC card that includes a resonance circuit including an antenna having an inductance component and a resonance capacitor is near the NFC device 50 while the NFC antenna 820 of the NFC device 50 emits the electromagnetic wave, a mutual induction may occur between the NFC antenna 820 and the external NFC card. Therefore, the external NFC card may receive the transmission signal by demodulating a signal generated by the mutual induction.

In a card mode, the NFC device 50 may communicate data with an external NFC reader using an electromagnetic wave emitted by the external NFC reader. That is, a mutual induction may occur between the NFC antenna 820 and the external NFC reader based on the electromagnetic wave emitted by the external NFC reader. Therefore, the NFC antenna 820 may provide an antenna voltage, which is generated at the first antenna electrode A1 through the mutual induction, to the NFC chip 801 through the matching circuit 831. The NFC chip 801 may receive data transmitted by the external NFC reader by demodulating the antenna voltage.

Figure 20:
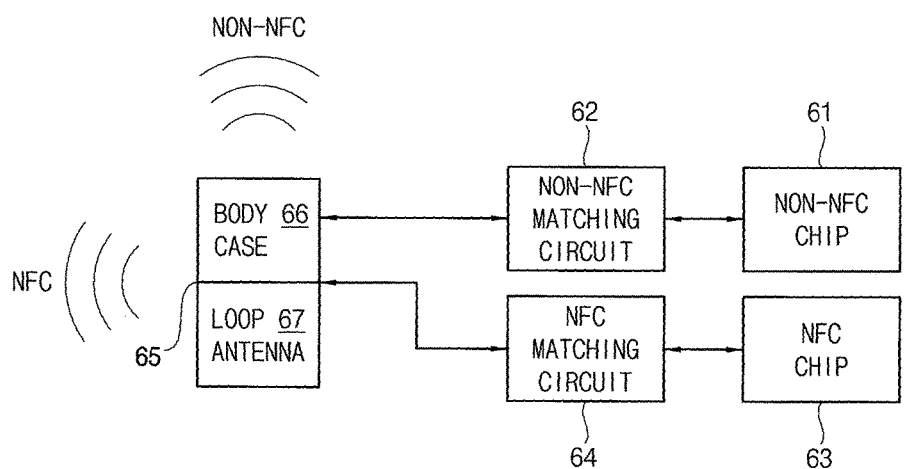
FIG. 20 is a block diagram illustrating a mobile device performing an NFC and a non-NFC according to example embodiments.
Figure 21:
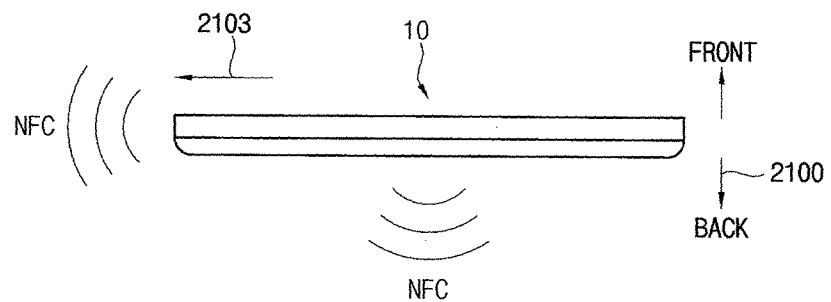
FIG. 21 is a diagram for describing an emission direction of an electromagnetic wave for the NFC emitted by the mobile device of FIG. 20.

FIG. 20 is a block diagram illustrating a mobile device performing an NFC and a non-NFC according to example embodiments, and FIG. 21 is a diagram for describing an emission direction of an electromagnetic wave for the NFC emitted by the mobile device of FIG. 20.

The mobile device 10 illustrated in FIG. 20 implements an NFC device and a non-NFC device included in the mobile device 10 of FIG. 1.

Referring to FIGS. 20 and 21, the mobile device 10 may include a non-NFC chip 61, a non-NFC matching circuit 62, an NFC chip 63, an NFC matching circuit 64, and an antenna structure 65.

The non-NFC chip 61 may output a non-NFC signal, and the NFC chip 63 may output an NFC signal.

The antenna structure 65 may include a body case 66 and a loop antenna 67 electrically connected to the body case 66. The body case 66 surrounds the display device 110 located at the front surface of the mobile device 10, embeds the non-NFC chip 61 and the NFC chip 63, and includes a metal material.

The body case 66 and the loop antenna 67 included in the antenna structure 65 may be implemented with any one of the body cases and any one of the loop antennas described above with reference to FIGS. 2 to 15.

Therefore, at least a portion of the body case 66 (e.g., the first metal structure 211) may be exposed at the upper surface of the mobile device 10, and operate as an antenna for the non-NFC (e.g., a long term evolution (LTE) communication, a wideband code division multiple access (WCDMA) communication, a wireless local area network (WLAN) communication, a global positioning system (GPS) communication, a Bluetooth communication, etc.).

In addition, at least a portion of the body case 66 (e.g., the second metal structure 241) and the loop antenna 67 may operate as an antenna for the NFC.

The non-NFC chip 61, the non-NFC matching circuit 62, the NFC chip 63, and the NFC matching circuit 64 may be embedded in the body case 66.

The non-NFC chip 61 may be coupled to the body case 66 through the non-NFC matching circuit 62. The non-NFC matching circuit 62 may perform an impedance matching between the body case 66, which operates as the non-NFC antenna, and the non-NFC chip 61. The non-NFC chip 61 may perform the non-NFC using the body case 66.

The NFC chip 63 may be coupled to the body case 66 and the loop antenna 67 through the NFC matching circuit 64. The NFC matching circuit 64 may perform an impedance matching between the body case 66 and the loop antenna 67, which operates as the NFC antenna, and the NFC chip 63. The NFC chip 63 may perform the NFC using the body case 66 and the loop antenna 67.

As described above, since the mobile device 10 emits an electromagnetic wave for the NFC through the body case 66 including a metal material in addition to emitting an electromagnetic wave for the NFC through the loop antenna 67, a performance of the NFC of the mobile device 10 may increase. In addition, as illustrated in FIG. 21, since the mobile device 10 emits an electromagnetic wave for the NFC both in a direction of the back surface of the mobile device 10 (e.g., a direction 2100) through the loop antenna 67 and in a direction of the upper surface of the mobile device 10 (e.g., a direction 2103) through at least a portion of the body case 66 (e.g., the first metal structure 211) that is exposed at the upper surface TOP of the mobile device 10, a recognition range of the NFC of the mobile device 10 may be widened.

Figure 22:
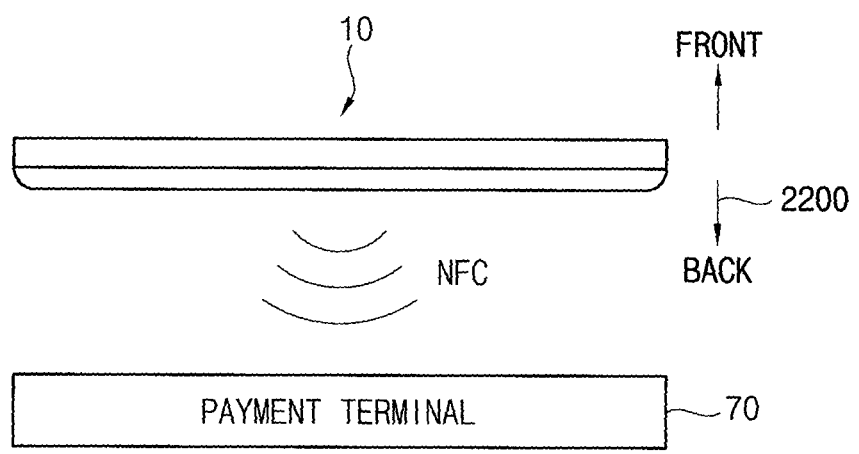
FIGS. 22 and 23 are diagrams for describing an NFC operations performed by a mobile device according to example embodiments.
Figure 23:
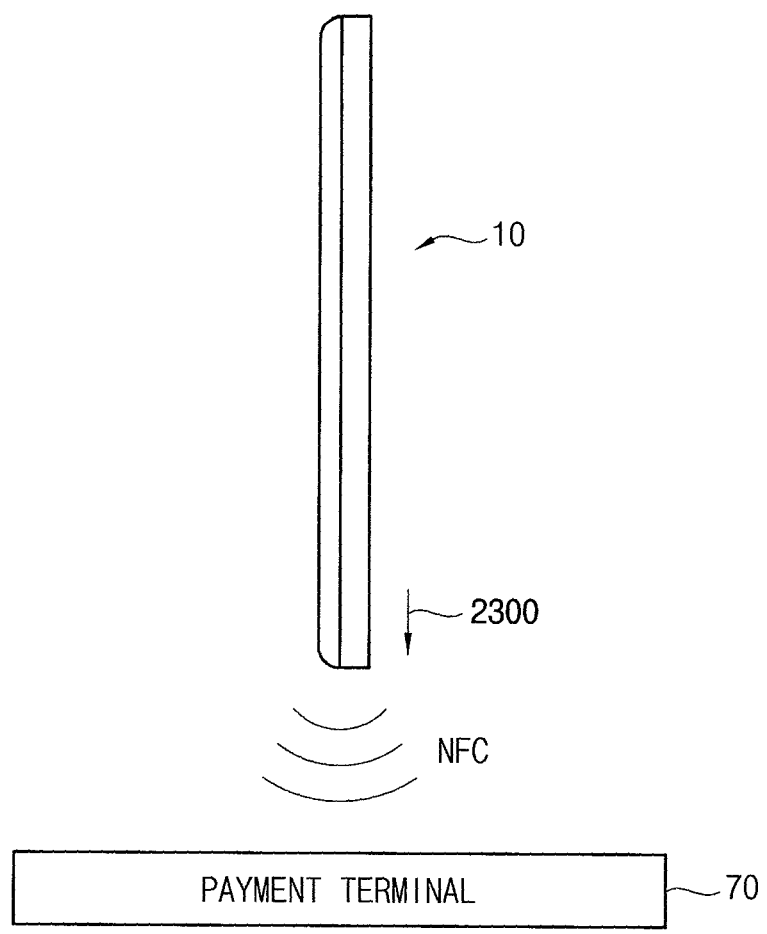

FIGS. 22 and 23 are diagrams for describing an NFC operations performed by a mobile device according to example embodiments.

The mobile device 10 of FIGS. 22 and 23 may correspond to the mobile device 10 described above with reference to FIGS. 1 to 21.

As illustrated in FIGS. 22 and 23, the mobile device 10 may perform an electronic payment by transmitting payment information (e.g., a credit card number) to a payment terminal 70 through the NFC.

As described above with reference to FIGS. 1 to 21, the mobile device 10 may emit an electromagnetic wave for the NFC both in a direction of the back surface of the mobile device 10 (e.g., a direction 2200) through the loop antenna and in a direction of the upper surface of the mobile device 10 (e.g., a direction 2300) through at least a portion of the body case that is exposed at the upper surface TOP of the mobile device 10.

Therefore, as illustrated in FIG. 22, the mobile device 10 may accurately perform the electronic payment when the mobile device 10 approaches to the payment terminal 70 while the mobile device 10 is positioned parallel with the payment terminal 70, and as illustrated in FIG. 23, the mobile device 10 may accurately perform the electronic payment when the mobile device 10 approaches to the payment terminal 70 while the mobile device 10 is positioned perpendicular to the payment terminal 70.

As such, the mobile device 10 may have a wide recognition range of the NFC, such that convenience of a user may be increased.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A near field communication antenna included in a mobile device, the near field communication antenna comprising:
    a body case comprising a metal material and accommodating semiconductor devices included in the mobile device, the body case comprising a frame that forms a sidewall of the mobile device; and
    a loop antenna electrically connected to the body case, the loop antenna and a first portion of the body case being configured to form a signal path to perform a near field communication, wherein a second portion of the body case operates as an antenna to perform a non-near field communication,
wherein the body case further comprises:
a first metal structure that constitutes the second portion of the body case;
a second metal structure; and
insulating regions between the first metal structure and the second metal structure, the insulating regions electrically insulating the first metal structure and the second metal structure, and
wherein the first metal structure and the insulating regions are disposed on a shorter sidewall of the frame.

2. The near field communication antenna of claim 1, wherein the loop antenna, at least a portion of the first portion of the body case, and a portion of the second portion of the body case are configured to form the signal path to perform the near field communication.

3. The near field communication antenna of claim 1, wherein a first end portion of the loop antenna is coupled to the first metal structure at a first point, and a second end portion of the loop antenna is coupled to the second metal structure at a second point, and
wherein the body case further comprises:
a first antenna electrode coupled to the first metal structure at a third point, which is spaced apart from the first point; and
a second antenna electrode coupled to the second metal structure at a fourth point, which is spaced apart from the second point.

4. The near field communication antenna of claim 3, wherein the signal path comprises the first antenna electrode, at least a portion of the first metal structure, the loop antenna, at least a portion of the second metal structure, and the second antenna electrode.

5. The near field communication antenna of claim 3, wherein the body case further comprises:
a first inductor coupled between the third point and the first antenna electrode; and
a second inductor coupled between the fourth point and the second antenna electrode.

6. The near field communication antenna of claim 3, wherein the body case further comprises:
a first low pass filter coupled between the third point and the first antenna electrode; and
a second low pass filter coupled between the fourth point and the second antenna electrode.

7. The near field communication antenna of claim 1, wherein a first end portion of the loop antenna is coupled to the first metal structure at a first point, and
wherein the body case further comprises:
a first antenna electrode coupled to a second end portion of the loop antenna; and
a second antenna electrode coupled to the first metal structure at a second point, which is spaced apart from the first point.

8. The near field communication antenna of claim 7, wherein the signal path comprises the first antenna electrode, the loop antenna, at least a portion of the first metal structure, and the second antenna electrode.

9. The near field communication antenna of claim 1, wherein a first end portion of the loop antenna is coupled to the second metal structure at a first point, and
wherein the body case further comprises:
a first antenna electrode coupled to a second end portion of the loop antenna;
a second antenna electrode coupled to the first metal structure at a second point; and
a first inductor electrically connecting the first metal structure and the second metal structure.

10. The near field communication antenna of claim 9, wherein the signal path comprises the first antenna electrode, the loop antenna, at least a portion of the second metal structure, the first inductor, at least a portion of the first metal structure, and the second antenna electrode.

11. The near field communication antenna of claim 1, wherein a first end portion of the loop antenna is coupled to the second metal structure at a first point, and the first metal structure is coupled to a ground voltage at a second point, and
wherein the body case further comprises:
a first antenna electrode coupled to a second end portion of the loop antenna; and
a first inductor electrically connecting the first metal structure and the second metal structure.

12. The near field communication antenna of claim 11, wherein the signal path comprises the first antenna electrode, the loop antenna, at least a portion of the second metal structure, the first inductor, at least a portion of the first metal structure, and the ground voltage.

* * * * *